United States Patent
Widdowson

(10) Patent No.: US 7,848,596 B2
(45) Date of Patent: Dec. 7, 2010

(54) TEMPLATED COLLAGE GENERATION WITH OCCLUSION COSTING

(75) Inventor: Simon Widdowson, Palo Alto, CA (US)

(73) Assignee: Hewlett-Packard Development Company, L.P., Houston, TX (US)

(*) Notice: Subject to any disclaimer, the term of this patent is extended or adjusted under 35 U.S.C. 154(b) by 768 days.

(21) Appl. No.: 11/440,736

(22) Filed: May 24, 2006

(65) Prior Publication Data

US 2008/0123993 A1      May 29, 2008

(51) Int. Cl.
*G06K 9/32* (2006.01)

(52) U.S. Cl. .................. 382/294; 382/282; 382/284; 358/1.2; 358/450

(58) Field of Classification Search ............... 382/282, 382/284, 294; 358/1.2, 450
See application file for complete search history.

(56) References Cited

U.S. PATENT DOCUMENTS

| | | | | |
|---|---|---|---|---|
| 5,581,377 A | * | 12/1996 | Shimizu et al. | 358/540 |
| 5,721,624 A | * | 2/1998 | Kumashiro et al. | 358/450 |
| 5,982,951 A | * | 11/1999 | Katayama et al. | 382/284 |
| 6,123,362 A | * | 9/2000 | Squilla et al. | 283/67 |
| 6,636,650 B1 | | 10/2003 | Long et al. | |
| 6,720,997 B1 | * | 4/2004 | Horie et al. | 348/218.1 |
| 6,727,909 B1 | | 4/2004 | Matsumura et al. | |
| 6,919,892 B1 | * | 7/2005 | Cheiky et al. | 345/473 |
| 7,286,806 B2 | * | 10/2007 | Kuehnel et al. | 455/226.3 |
| 7,526,137 B2 | * | 4/2009 | Ishizaka | 382/254 |
| 7,529,429 B2 | * | 5/2009 | Rother et al. | 382/284 |
| 7,573,486 B2 | * | 8/2009 | Mondry et al. | 345/619 |
| 2002/0095439 A1 | | 7/2002 | Long et al. | |
| 2004/0165000 A1 | | 8/2004 | Nagahashi et al. | |
| 2005/0071781 A1 | | 3/2005 | Atkins | |
| 2006/0103667 A1 | | 5/2006 | Amit et al. | |
| 2007/0253028 A1 | | 11/2007 | Widdowson | |
| 2008/0101761 A1 | | 5/2008 | Widdowson | |

FOREIGN PATENT DOCUMENTS

| | | |
|---|---|---|
| EP | 0784294 A | 7/1997 |
| EP | 1220531 A | 7/2002 |
| EP | 1431921 A | 6/2004 |
| EP | 1610542 A | 12/2005 |

OTHER PUBLICATIONS

Geigel J et al. "Using genetic algorithm for album page layouts"-IEEE Multimedia vol. 10 No. 4-Oct. 2003 - pp. 16-26.
Wang, Jingdong et al.-"Picture Collage"-Computer Vision and Pattern Recognition, 2006 IEEE Computer Society Conference vol. 1-Jun. 17, 2006-pp. 347-354.

* cited by examiner

*Primary Examiner*—Yosef Kassa

(57) ABSTRACT

In a computer implemented method of generating a collage of images, image saliency data is received for a plurality of images that are to be collaged within a templated viewing region. The templated viewing region is generated by scaling a template relative to the plurality of images that are to be collaged. An initial collage layout is generated within the templated viewing region from the plurality of images. The initial collage layout is optimized, where the optimizing comprises iteratively adjusting the initial collage layout by selecting a minimized layout occlusion cost.

20 Claims, 24 Drawing Sheets

2300

RECEIVING IMAGE SALIENCY DATA FOR A PLURALITY OF IMAGES, THE PLURALITY OF IMAGES TO BE COLLAGED WITHIN A TEMPLATED VIEWING REGION.
2310

SCALING A TEMPLATE RELATIVE TO THE PLURALITY OF IMAGES TO GENERATE A TEMPLATED VIEWING REGION.
2315

GENERATING AN INITIAL COLLAGE LAYOUT OF THE PLURALITY OF IMAGES WITHIN THE TEMPLATED VIEWING REGION.
2320

OPTIMIZING THE INITIAL COLLAGE LAYOUT, WHEREIN THE OPTIMIZING COMPRISES ITERATIVELY ADJUSTING THE INITIAL COLLAGE LAYOUT BY SELECTING A MINIMIZED LAYOUT OCCLUSION COST.
2330

SEEDING A FIRST IMAGE INTO A TEMPLATED VIEWING REGION TO START A COLLAGE.
2410

↓

SCALING THE TEMPLATED VIEWING REGION RELATIVE TO A PLURALITY OF IMAGES BEING COLLAGED
2415

↓

PROVIDING A PLURALITY OF TRIAL LAYOUT ARRANGEMENTS WITH AN ADDITIONAL IMAGE ADDED TO THE COLLAGE.
2420

↓

GENERATING AN OCCLUSION COST FOR A TRIAL LAYOUT ARRANGEMENT OF THE PLURALITY OF TRIAL LAYOUT ARRANGEMENTS, WHEREIN THE OCCLUSION COST REPRESENTS IMAGE SALIENCY OCCLUDED AND VIEWING REGION SALIENCY OCCLUDED BY THE TRIAL LAYOUT ARRANGEMENT.
2430

↓

ADDING AN IMAGE TO THE COLLAGE, WHEREIN THE COLLAGE IS UPDATED TO REFLECT ONE OF THE TRIAL LAYOUT ARRANGEMENTS FOR WHICH THE OCCLUSION COST HAS BEEN GENERATED.
2440

↓

INCORPORATING A PLURALITY OF IMAGES SEQUENTIALLY INTO THE COLLAGE, WHEREIN THE INCORPORATING COMPRISES REPEATING THE PROVIDING, THE GENERATING, AND THE ADDING UNTIL THE PLURALITY OF IMAGES IS INCORPORATED INTO THE COLLAGE.
2450

FIG. 24

TEMPLATED COLLAGE GENERATION WITH OCCLUSION COSTING

TECHNICAL FIELD

Embodiments of the present invention relate to generating collages of images. More specifically, embodiments of the present invention relate to using occlusion cost information in the generation of collages of images within templated viewing regions.

BACKGROUND

For decades, one of the most popular formats for the presentation of analog image content has been the collage. Artful juxtaposition of photographs in a collage creates a visually attractive layout bereft of the repetitive structure that the eye can so easily detect. Collages represent a certain lack of orderliness that breaks away from other more structured alternatives of visually displaying images. However, a good collage depends in part on an analysis of the content itself. For example, it is important to overlap images, but not by so much that the layering results in the covering of a face or some other object of interest in an image.

Manual creation of good collages of analog images is a very labor intensive process, requiring numerous rearranging and reordering of images. Likewise, manual creation of good collages of digital images is also a very labor intensive process requiring a large amount of time spent manipulating arrangements and positions of digital images, for example, with an image editing computer program.

Automated methods for creating collages of digital images currently exist, however they suffer from many shortcomings. These existing automated methods tend to fall into two categories; a safe collage creation method, and an aggressive collage creation method.

In the safe collage creation method, collages are created with only a very small amount of overlap between images. Collages created with the safe method often look more akin to a tiling of images than to an artfully created collage. This minimal overlap helps prevent the occlusion of faces and other important image details, but it typically results in a very boring collage that is not visually pleasing. Furthermore, even with this minimal overlap, faces and other important features are often arbitrarily obscured when they are located near the edge of an image.

In the aggressive collage creation method, collages are created with aggressive overlap of one image atop another. Collages created using the aggressive method pack images efficiently into a viewing region, but the most interesting content of the images is often obscured. Though it is possible to create a good collage this way, it is more likely that faces or interesting areas of images will be arbitrarily occluded, thus resulting in a collage that is not visually pleasing.

Templated collages are collages that are formatted into the approximate shape of a template, such as, for example: a letter, a word, a number, a figure, or some design. Automated templated collages can be created by the safe and aggressive methods previously described, and suffer the same drawbacks previously described. A templated collage can also be created by "cutting" a desired shape out of an existing collage. However, because this method arbitrarily cuts out images and parts of images that lie outside of the cut-out portion, important features of images, such as faces, are often arbitrarily eliminated during the cutting process.

With the rapid rise in use of digital cameras and powerful viewing devices such as personal computers, the need to display multimedia content in an attractive manner is becoming increasingly prevalent. The templated collage is a pleasing and useful method for displaying images. However, as described, current methods for creating good templated collages of digital images are either labor intensive or else suffer from drawbacks which result in the automated creation of unpleasing collages or collages which arbitrarily eliminate interesting or important portions of the images in the collage.

BRIEF DESCRIPTION OF THE DRAWINGS

The accompanying drawings, which are incorporated in and form a part of this specification, illustrate embodiments of the invention and, together with the description, serve to explain principles discussed below:

FIG. 23 is a flow diagram of a method of iteratively generating a templated collage of images, according to one embodiment of the present invention.

FIG. 24 is a flow diagram of a method of additively generating a collage of images, according to one embodiment of the present invention.

The drawings referred to in this description should not be understood as being drawn to scale unless specifically noted.

DETAILED DESCRIPTION OF THE INVENTION

Reference will now be made in detail to embodiments of the present invention, examples of which are illustrated in the accompanying drawings. While the present invention is described in conjunction with various embodiments, it will be understood that they are not intended to limit the present invention to these embodiments. On the contrary, the presented technology is intended to cover alternatives, modifications and equivalents, which may be included within the spirit and scope the various embodiments as defined by the appended claims. Furthermore, in the following detailed description, numerous specific details are set forth in order to provide a thorough understanding of the present invention. However, the present invention may be practiced without these specific details. In other instances, well known methods, procedures, components, and circuits have not been described in detail as not to unnecessarily obscure aspects of the present invention.

Unless specifically stated otherwise as apparent from the following discussions, it is appreciated that throughout the present detailed description, discussions utilizing terms such as "seeding", "providing", "generating", "adding", "incorporating", "repeating", "scaling", "attributing", "optimizing", "placing", "selecting", "adjusting", "displaying", "calculating", "updating", "displaying", "minimizing", "acquiring", "rotating", and "receiving", "ensuring", "continuing", "utilizing", or the like, refer to the actions and processes of a computer system (such as computer 100 of FIG. 1), or similar electronic computing device. The computer system or similar electronic computing device manipulates and transforms data represented as physical (electronic) quantities within the computer system's registers and memories into other data similarly represented as physical quantities within the computer system memories or registers or other such information storage, transmission, or display devices. The present invention is also well suited to the use of other computer systems such as, for example, optical, virtual, and mechanical computers. Additionally, it should be understood that in embodiments of the present invention, one or more of the steps can be performed manually.

EXAMPLE COMPUTER SYSTEM ENVIRONMENT

Figure 1:
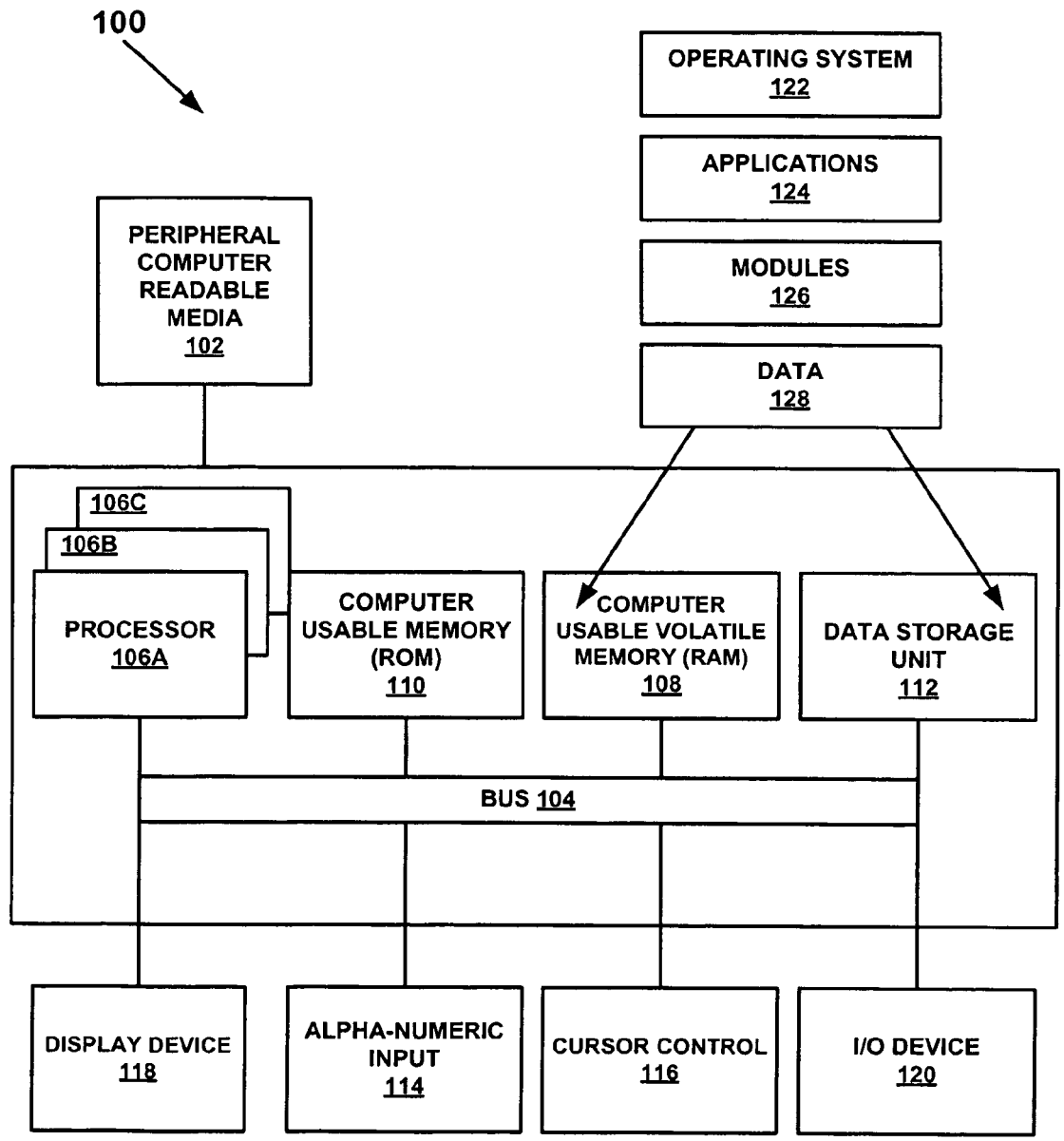
FIG. 1 is a diagram of an exemplary computer system used in accordance with embodiments of the present invention.

With reference now to FIG. 1, portions of the present invention are composed of computer-readable and computer-executable instructions that reside, for example, in computer-usable media of a computer system. That is, FIG. 1 illustrates one example of a type of computer that can be used to implement embodiments, which are discussed below, of the present invention. FIG. 1 illustrates an exemplary computer system 100 used in accordance with embodiments of the present invention. It is appreciated that system 100 of FIG. 1 is exemplary only and that the present invention can operate on or within a number of different computer systems including general purpose networked computer systems, embedded computer systems, routers, switches, server devices, client devices, various intermediate devices/nodes, stand alone computer systems, digital cameras, handheld devices, and the like. As shown in FIG. 1, computer system 100 of FIG. 1 is well adapted to having peripheral computer readable media 102 such as, for example, a floppy disk, a compact disc, and the like coupled thereto.

System 100 of FIG. 1 includes an address/data bus 104 for communicating information, and a processor 106A coupled to bus 104 for processing information and instructions. As depicted in FIG. 1, system 100 is also well suited to a multi-processor environment in which a plurality of processors 106A, 106B, and 106C are present. Conversely, system 100 is also well suited to having a single processor such as, for example, processor 106A. Processors 106A, 106B, and 106C may be any of various types of microprocessors. System 100 also includes data storage features such as a computer usable volatile memory 108, e.g. random access memory (RAM), coupled to bus 104 for storing information and instructions for processors 106A, 106B, and 106C. System 100 also includes computer usable non-volatile memory 110, e.g. read only memory (ROM), coupled to bus 104 for storing static information and instructions for processors 106A, 106B, and 106C. Also present in system 100 is a data storage unit 112 (e.g., a magnetic or optical disk and disk drive) coupled to bus 104 for storing information and instructions. System 100 also includes an optional alphanumeric input device 114 including alphanumeric and function keys coupled to bus 104 for communicating information and command selections to processor 106A or processors 106A, 106B, and 106C. System 100 also includes an optional cursor control device 116 coupled to bus 104 for communicating user input information and command selections to processor 106A or processors 106A, 106B, and 106C. System 100 of the present embodiment also includes an optional display device 118 coupled to bus 104 for displaying information.

Referring still to FIG. 1, optional display device 118 may be a liquid crystal device, cathode ray tube, plasma display device or other display device suitable for creating graphic images and alphanumeric characters recognizable to a user. Optional cursor control device 116 allows the computer user to dynamically signal the movement of a visible symbol (cursor) on a display screen of display device 118. Many implementations of cursor control device 116 are known in the art including a trackball, mouse, touch pad, joystick or special keys on alpha-numeric input device 114 capable of signaling movement of a given direction or manner of displacement. Alternatively, it will be appreciated that a cursor can be directed and/or activated via input from alpha-numeric input device 114 using special keys and key sequence commands. System 100 is also well suited to having a cursor directed by other means such as, for example, voice commands. System 100 also includes an I/O device 120 for coupling system 100 with external entities. For example, in one embodiment, I/O device 120 is a modem for enabling wired or wireless communications between system 100 and an external network such as, but not limited to, the Internet.

Referring still to FIG. 1, various other components are depicted for system 100. Specifically, when present, an operating system 122, applications 124, modules 126, and data 128 are shown as typically residing in one or some combination of computer usable volatile memory 108, e.g. random access memory (RAM), and data storage unit 112. In one embodiment, the present invention, for example, is stored as an application 124 or module 126 in memory locations within RAM 108 and memory areas within data storage unit 112.

Occlusion Costing

Occlusion costing is a means to determine a quantitative occlusion cost associated with the relative position(s) of, and any potential overlapping between, the one or more images to be displayed in a viewing region. One example of a method used to derive an occlusion cost for an image is shown by the cost equation shown in Table 1.

The equation of Table 1 relies on the use of saliency information, such as, for example saliency maps. As described further below, saliency maps and many other techniques for determining image saliency are well known. Saliency maps, for example, typically provide a corresponding mapping of salient regions for a particular image. Typically the salience for an image region, which may be as small as a pixel of an image, has a corresponding score in the saliency map/data. For example, a saliency map of an image may be comprised of a grey-scale map of the image. In such a saliency map, saliency values may be assigned on a scale, for example from 0 to 255, with the highest saliency represented by a white pixel and a value of 255 and the lowest saliency represented by a black pixel and a value of 0. Equations displayed in Tables 1-5 and 7 are techniques for summing these corresponding saliency values to determine specific occlusion costs for an image, layout, or portion of a layout within a viewing region.

The equation in Table 1 calculates the level of saliency for occluded regions in an image and divides it by the total sum of the saliency in the entire image. The result is an occlusion cost for having a region of an image covered or occluded in a layout orientation. For example, in one embodiment, the equation in Table 1 is used to determine the occlusion cost for a layout orientation of a single image to be displayed alone in a viewing region. It can also be used to calculate, via summation, the occlusion cost for a layout of multiple images being displayed concurrently in a viewing region. The cost value is generated in a range from zero to one and can be thought of as a percentage. A cost closer to one equals nearly total occlusion, while a cost closer to zero indicates very little occlusion.

TABLE 1

Example Equation for Calculation Occlusion Cost of a Layout $Cost = \Sigma_{all\ images}$ (Total Saliency Occluded/Total Image Saliency)

If an occlusion cost is calculated for a single layout of an image being displayed within a viewing region, then the calculation utilizes saliency data for the image to determine the occlusion cost of the layout of that image. If there is more than one layout of the image, the occlusion cost can be determined for each layout of the image. If more than one image is being processed for concurrent display in a viewing region, an occlusion cost can be calculated for each of the multiple images to determine the occlusion cost of the layout for concurrently presenting the multiple images within the viewing region. If there is more than one layout for concurrently presenting the multiple images within the viewing region, the occlusion cost can be determined for each layout of the multiple images.

In some embodiments, additional user-specified values can be added directly into occlusion cost calculations as non-linearities to be incorporated in the occlusion cost determination. In other embodiments, additional user-specified parameters can be added directly to the saliency data (such as image saliency maps) that is used for the occlusion cost calculations. For instance, if it is important that a certain face (or a specific image region) not be occluded, the face can be marked with high saliency in the image saliency data/map by setting a user-defined parameter. For example, a user may mark a face as containing a highly salient feature. This ensures that in most cases if such a pre-marked face is occluded, a high occlusion cost (of one or close to one) will result from the occlusion cost determination.

Additional variables may also be included in the occlusion cost function shown in Table 1, so that a term relating to the scale of each image is added to the function. Thus if an image is enlarged in scale, the cost related to its scale will be decreased, since the increase in scale will result in an increase in the instances of the image either being occluded or causing occlusion of another image. Table 2 shows a sample of an occlusion cost function with scaling information added.

In the example occlusion cost function shown in Table 2, "n" and "m" can be set as constrained values. Large or small values of "n" and "m" will result in more or less aggressive scaling of the images. The values of "n" and "m" can also be input as user-specified parameters, resulting in layout orientation generation and image saliency generation being adjusted in accordance with the scale of an image or images.

TABLE 2

Example Equation Including Image Scale in Occlusion Cost Calculation $$Cost = \frac{\left[\sum_{all\ images} (Total\ Saliency\ Occluded/Total\ Image\ Saliency)\right]}{[(Scale\ of\ image\ 1)^n * (Scale\ of\ image\ 2)^m]}$$

In some embodiments of the present invention, the calculation of an occlusion cost can be further refined to better calculate occlusion costs based on area compensation of occlusions of an image in a layout. For instance after receiving the saliency data and receiving layout orientation data for the display of an image (or concurrent display of multiple images) in a viewing region, the data pertaining to the saliency and specific layout can be used to optimally determine the occlusion cost of a particular image in the layout. An occlusion cost can be determined based on the position of each image and how each image overlaps with another image or with the edge of the viewing region. The occlusion cost is can then calculated based on three co-dependent components: the total saliency density of the viewing region, the fractional saliency visible, and the scaling of an image based on its total information content.

A specific instantiation of an area compensated occlusion costing calculation is shown in Table 3. The un-simplified version of the equation in Table 3 (to the left of the equal sign) contains three components which respectively relate to the three co-dependent components: the total saliency density of the viewing region, the fractional saliency visible, and the scaling of an image based on its total information content.

TABLE 3

Example Equation for Area Compensated Occlusion Cost of an Image $$C_i = \left(\frac{\sqrt{A_f}}{S_{v,i}}\right) * \left(\frac{S_{T,i}}{S_{v,i}}\right) * \left(\frac{S_{T,i}}{\sqrt{A_i}}\right) = \sqrt{\frac{A_f}{A_i}} * \frac{S_{T,i}^2}{S_{v,i}^2}$$

TABLE 3-continued

Example Equation for Area Compensated Occlusion Cost of an Image

Where:
$C_i$ is the cost associated with image i
$S_{v,i}$ is the fraction of saliency of image i which is visible
$S_{T,i}$ is the total saliency of image i
$A_i$ is the area of image i
$A_f$ is the area of the frame (window)

In Table 3, the total saliency density in the viewing region portion of the calculation attempts to maximize the amount of visible saliency captured within the viewing region. The fractional saliency visible portion of the calculation seeks to minimize the amount of saliency that is occluded in the layout, either by overlapping one image atop another, or by cropping part of an image with the edge of the viewing region. The portion of the calculation devoted to scaling an image based on its content seeks to create an even distribution of saliency across the viewing region by weighting the image cost toward increasing the scale of an image with high information content (e.g. landscape, rooftops, trees, etc.) and decreasing the scale of an image with lower information content (e.g. a single face). The area of the frame component of the calculation is the area of the viewing region.

TABLE 4

Example Equation for Area Compensated Occlusion Cost of a Layout $$C(L) = \sqrt[n]{\prod_{i=1}^{n} C_i}$$

Where:
C(L) is the area compensated occlusion cost an entire layout of images being concurrently displayed in a shared viewing region
n is the number of layouts, where n >= 1
$C_i$ is the area compensated occlusion cost associated with image I (see equation in Table 3)

In one embodiment, if an area compensated occlusion cost is being calculated for a layout comprising more than one image to be concurrently displayed within a viewing region, this comprises calculating the area compensated occlusion cost for each image in the layout and then calculating the area compensated occlusion cost for the entire layout. By calculating the geometric mean of the costs of each independent image, the area compensated occlusion cost for the entire layout is generated. An example of an area compensated occlusion costing function for a layout with multiple images concurrently displayed in a shared viewing region is shown in Table 4.

General Description of the Present Technology for Collage Generation with Occlusion Costing The present technology of collage generation with occlusion costing provides methods and systems for generating collages of images. The present methods and systems apply techniques for occlusion costing to generate collages. Through application of these techniques embodiments of the present invention generate collages which provide significant overlap of image areas, yet minimize the occlusion of salient areas of the collaged images, such as faces and other interesting areas. Some embodiments of the present invention, utilize saliency information, such as saliency maps, to identify salient areas such as faces and other interesting objects that are present in images. Through use of such saliency data, embodiments of the present invention calculate an occlusion cost of a layout and generate collages which minimize the occlusion of image areas that are identified as salient. Some embodiments of the present invention also utilize saliency attributed to a viewing region that a collage is being displayed within. This allows the present invention to calculate an occlusion cost which balances occlusion of image saliency with occlusion of viewing region saliency. This allows some embodiments of the present invention to generate collages which balance overlap of images with efficient use of the viewing region.

In applying occlusion costing to the generation of collages, collages of hundreds (or even more) images can be automatically generated. When such collages are generated, and images are allowed to move freely in all dimensions (position, scale, rotation, and z-order), the solution set for generating a collage is essentially infinite. Embodiments of the present invention thus seek to simplify the solution set.

For example, in one embodiment, the scale and rotation of each image is fixed. Limiting these degrees of freedom limits the solution set and allows application of traditional optimization techniques. Since angular diversity is a key feature of a collage, one embodiment of the present invention forces a distribution of orientations prior to layout of a collage. Additionally, one embodiment of the present invention sets the image sizes prior to layout. An advantage to applying these limitations prior to layout is that image rotation and scaling are both computationally costly. Thus, collage generation time is significantly shortened by not repeatedly re-performing these operations during collage generation.

In one embodiment of the present invention, "efficiency" of the collage layout is also fixed prior to collage generation. In this context, "efficiency" is defined as the ratio of the sums of the images' areas to the total area of the layout. A low efficiency indicates that images have substantial space to move around, and will overlap only slightly, if at all, during collage generation. A high efficiency forces substantial overlap between images, and increases the risk of an objectionable occlusion of a salient area, such as a face. Fixing efficiency of the layout prior to generation of a collage constrains another degree of freedom and makes the solution set for generating a collage more tractable.

In some embodiments, occlusion costing methods are applied to generate a templated collage, such as, for example, a collage that has the overall shape of a letter, word, number, or design.

Exemplary System for Collage Generation with Occlusion Costing

Figure 2:
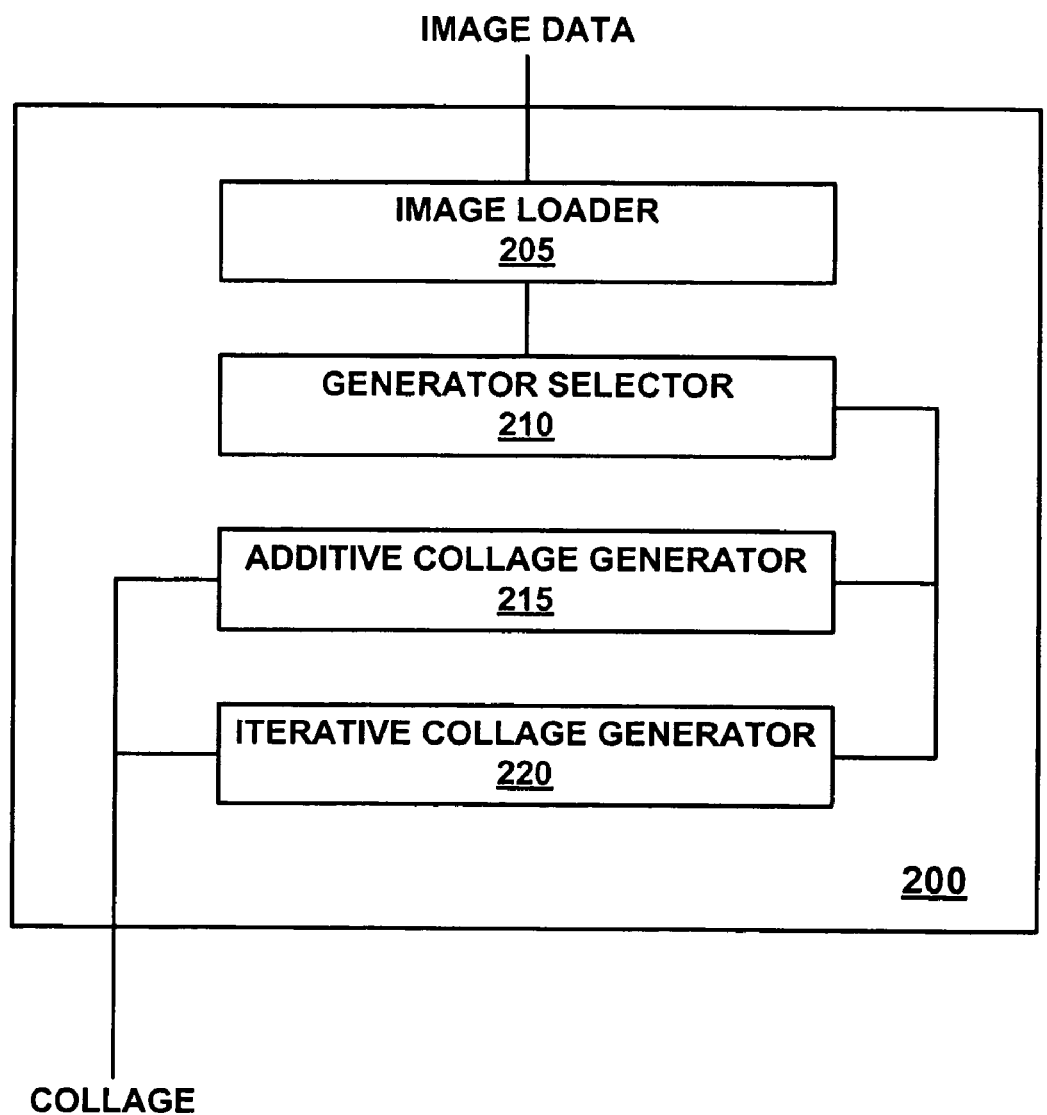
FIG. 2 is a block diagram of an exemplary system for collage generation, according to the present invention.

FIG. 2 is a block diagram of an exemplary system 200 for collage generation, according to the present invention. System 200 automatically generates a collage of images from image data of digital images. System 200 is comprised of an image loader 205, a generator selector 210, an additive collage generator 215, and an iterative collage generator 220.

Image loader 205 is for receiving and manipulating image data, and in one embodiment is coupled to a computer system, such as computer system 100, which provides this image data. As shown in FIG. 2, image loader 205 is also coupled to generator selector 210. Image loader 205 is additionally coupled, via generator selector 210, to additive collage generator 215 and iterative collage generator 220. Additive collage generator 215 and iterative collage generator 220 are both coupled to an output for outputting generated collages, for example, to a display device or to a portion of computer system 100. Functioning of image loader 205 is described further in conjunction with FIG. 4 and FIG. 5.

Generator selector 210 is configured to couple to image loader 205, and in one embodiment, is a part of image loader 205. Generator selector 210 selects a collage layout generator for use in generating a collage. In one embodiment, generator selector 210 makes this selection based the number of images that are being collaged in a viewing region. By way of example and not of limitation, in one embodiment, generator selector 210 selects additive collage generator 215 when fifteen or fewer images are being collaged within a viewing region. Likewise, in such an embodiment, generator selector 210 selects iterative collage generator 220 when more than fifteen images are being collaged within a viewing region. Such a selection mechanism is advantageous, as additive collage generator 215 is comparatively more efficient when collaging smaller numbers of images, while iterative collage generator 220 is comparatively more efficient when collaging larger numbers of images.

It is appreciated that other breakpoints for selection of a collage generator are used in other embodiments. It is also appreciated that in some embodiments, generator selector 210 selects between additive collage generator 215 and iterative collage generator 220 based on a user input of a breakpoint number or other selection criteria such as desired collage efficiency or desired speed for generating a collage. It is also appreciated that in some embodiments, generator selector 210 and one of the collage generators (215 or 220) are not utilized.

Additive collage generator 215 is configured to couple to image loader 205 for receiving image data as directed by generator selector 210. Additive collage generator 215 generates collages by sequentially adding images to a viewing region in a fashion designed to minimize occlusion of images and of the viewing region. Additive collage generator 215 is described further in conjunction with FIGS. 6-10.

Iterative collage generator 220 is configured to couple to image loader 205, for receiving image data as directed by generator selector 210. Iterative collage generator 220 generates collages by iteratively minimizing an occlusion cost of an initial layout of a plurality of images within a viewing region. Iterative collage generator 220 is described further in conjunction with FIGS. 11-17.

In some embodiments of the present invention, collage generation elements (215 and 220) of system 200 are utilized sequentially. For example, in one such embodiment, additive collage generator 215 is selected by generator selector 210 to generate an in initial collage layout of a plurality of images through use of an additive collage generation process (described below). This additively generated collage is then coupled to iterative collage generator 220 as an initial collage layout. Iterative collage generator 220 performs iterative optimization of this initial collage by selectively z-ordering and/or nudging the images to minimize occlusion cost (as described below).

Exemplary Images

Figure 3:
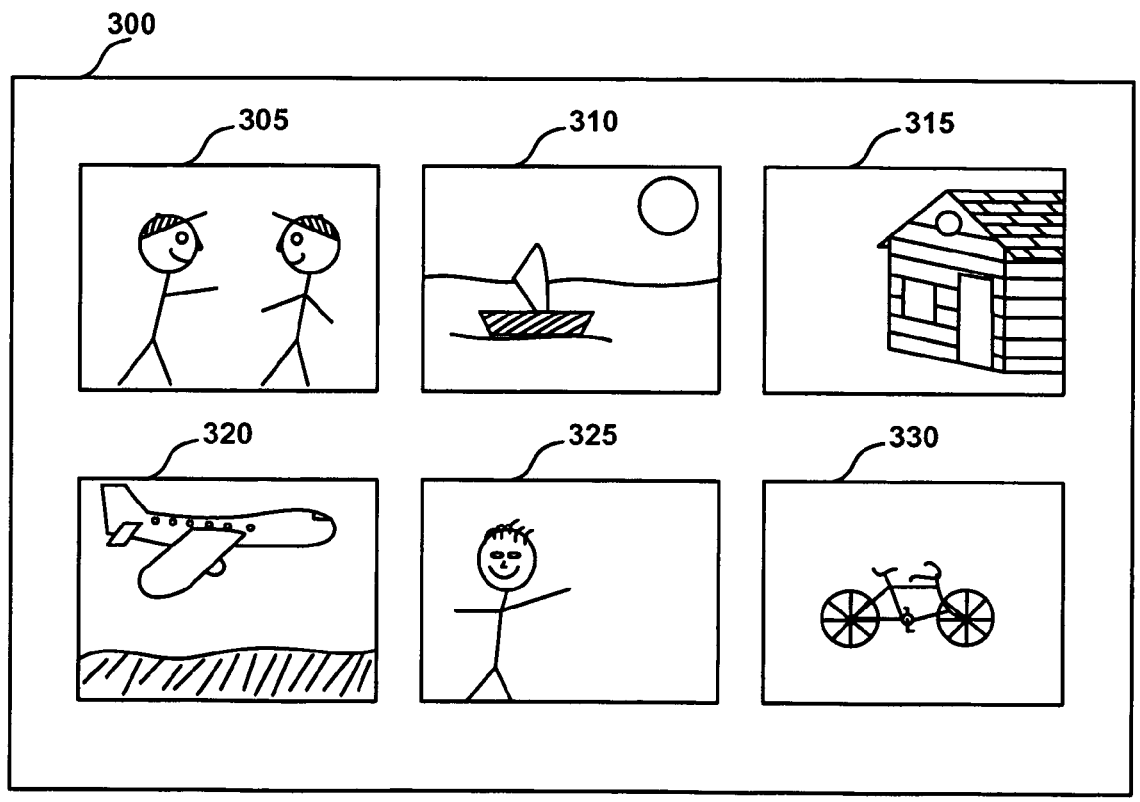
FIG. 3 shows a plurality of exemplary images arranged in a viewing region, according to one embodiment of the present invention.

FIG. 3 shows a plurality of exemplary images (305, 310, 315, 320, 325, and 330) arranged in a viewing region 300, according to one embodiment of the present invention. The arrangement shown in FIG. 3 is an example of an initial structured layout of a plurality of images within a viewing region. Structured layouts also comprise tiled edge-to-edge layouts, slightly overlapped layouts of images, and other layouts generated according to a pattern or plan. Such initial layouts of a plurality of images are used in one embodiment of iterative collage generator 220.

Techniques for recognizing objects and determining salient (or interesting) portions of images are known, and described in works such as, A Model of Saliency-Based Visual Attention for Rapid Scene Analysis, Laurent Itti, Christof Koch, and Ernst Niebur, IEEE Transactions on Pattern Analysis and Machine Intelligence, November 1998; and Robust Real-Time Object Detection, Paul Viola and Michael Jones, Second International Workshop on Statistical and Computational Theories of Vision—Modeling, Learning, Computing, and Sampling, Jul. 13, 3001.

Each of the images (305, 310, 315, 320, 325, and 330) contains salient and non-salient areas. In image 305, the two people wearing baseball caps are considered salient areas. In image 310 the sailboat and sun are salient areas. In image 315 the house is a salient area. In image 320, the airplane is a salient area. In image 325, the person with outstretched arms is a salient area. In image 330, the bicycle is a salient area. Each of these images (305, 310, 315, 320, 325, and 330) also contains non-salient areas, such as empty space. The present invention, seeks to generate collages from images, such as these exemplary images, which promote overlap of the images while minimizing obscuring of salient areas. The present invention makes use of techniques such as image saliency maps, which are known in the art, to identify salient areas of images. In one embodiment, image loader 205 generates such saliency maps from image data such as, for example, bitmaps of images.

Exemplary Image Loader

Figure 4:
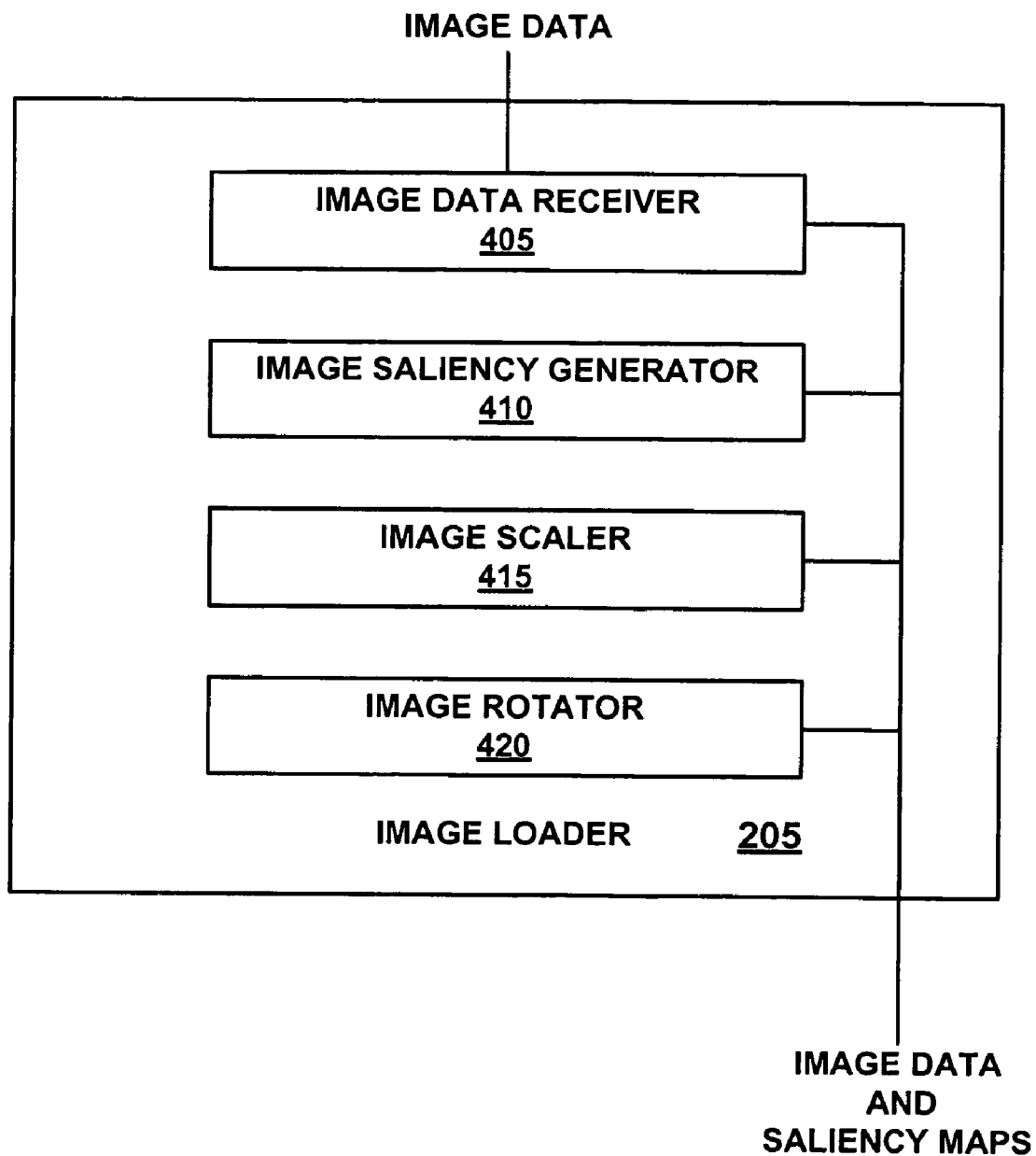
FIG. 4 is a block diagram of an exemplary image loader, according to one embodiment of the present invention.

FIG. 4 is a block diagram of an exemplary image loader 205, according to one embodiment of the present invention. Image loader 205, is comprised of an image data receiver 405, an image saliency generator 410, an image scaler 415, and an image rotator 420. As shown in FIG. 4, image data receiver 405, image saliency generator 410, image scaler 415, and image rotator 420 are all coupled to one another and to a common output. This allows for interchange of information, as required, between elements of image loader 205. This also allows image loader 205 to output image data, such as: image bitmaps, scaled and/or rotated image bitmaps, image saliency data/maps, scaled and/or rotated image saliency maps, and other image data to other elements of system 200. In one embodiment, image loader 205 outputs such image data in the form of image tiles (510 and 510A of FIG. 5), which are used to generate collages.

Image data receiver 405 receives or acquires image data, such as image bitmaps and saliency maps, from an image data source such as computer system 100. This image data is coupled to image saliency generator 410, image scaler 415, and image rotator 420, as required.

Image saliency generator 405 generates image saliency data, which identifies important or interesting areas in images. This image saliency data, which takes the form of saliency maps in some embodiments, is generated from image data such as bitmaps of images. Image saliency data for an image comprises information such as saliency maps, facial recognition information, and other image analysis information. Image saliency generator 410 generates saliency data based on well-known and established image processing techniques, such as techniques for determining saliency and recognizing objects such as faces. In some embodiments, the image saliency information is also generated based on user-specified parameters or constraints, such as a user marking of a particularly salient area of an image.

Image saliency generator 405 then outputs saliency data for each image in a form such as a ranking or mapping of salient areas of images. For instance, in some embodiments of the present invention the image saliency data can be represented as a grayscale image, where the value of each pixel is the saliency score for that pixel. In other embodiments of the present invention each image has saliency data passed in the form of a map, which may contain scores indicating the relative saliency of each section of the map. The saliency data represents the special distribution of "interest" within an image, and hence which areas of an image should remain visible, and which may be safely occluded.

Image scaler 415 scales images and/or saliency data of images. For example, in one embodiment, images and saliency data are scaled to some constant area. In one embodiment, this constant area remains fixed throughout the collage generation process to reduce a degree of freedom (image scale), and thus simplify the set of solutions for generating a collage from a plurality of images. In such an embodiment, the pixel area is set as a constant area rather than a constant linear dimension. This reduces or eliminates the need to compensate for diversity in image aspect ratio. For example, in one embodiment, image scaler 415 scales images and/or saliency maps to a set area of 30,000 pixels.

Image rotator 420 rotates image data and/or image saliency data. In one embodiment of the present invention, image data and/or saliency data for each image is randomly rotated a number of degrees (within an allowable range). In another embodiment, image data and/or saliency data for each image is rotated according to a preset pattern. For example, data for a first image is not rotated, data for a second image is rotated ten degrees to the right, data for a third image is rotated ten degrees to the left, and the pattern then repeats with subsequent images. In one embodiment, image rotator 420 outputs rotated and scaled images and saliency data as image tiles (510, and 510A) which are used in generation of collages. In one embodiment, this rotation remains fixed throughout the collage generation process to reduce a degree of freedom (image rotation), and thus simplify the set of solutions for generating a collage from a plurality of images.

Figure 5:
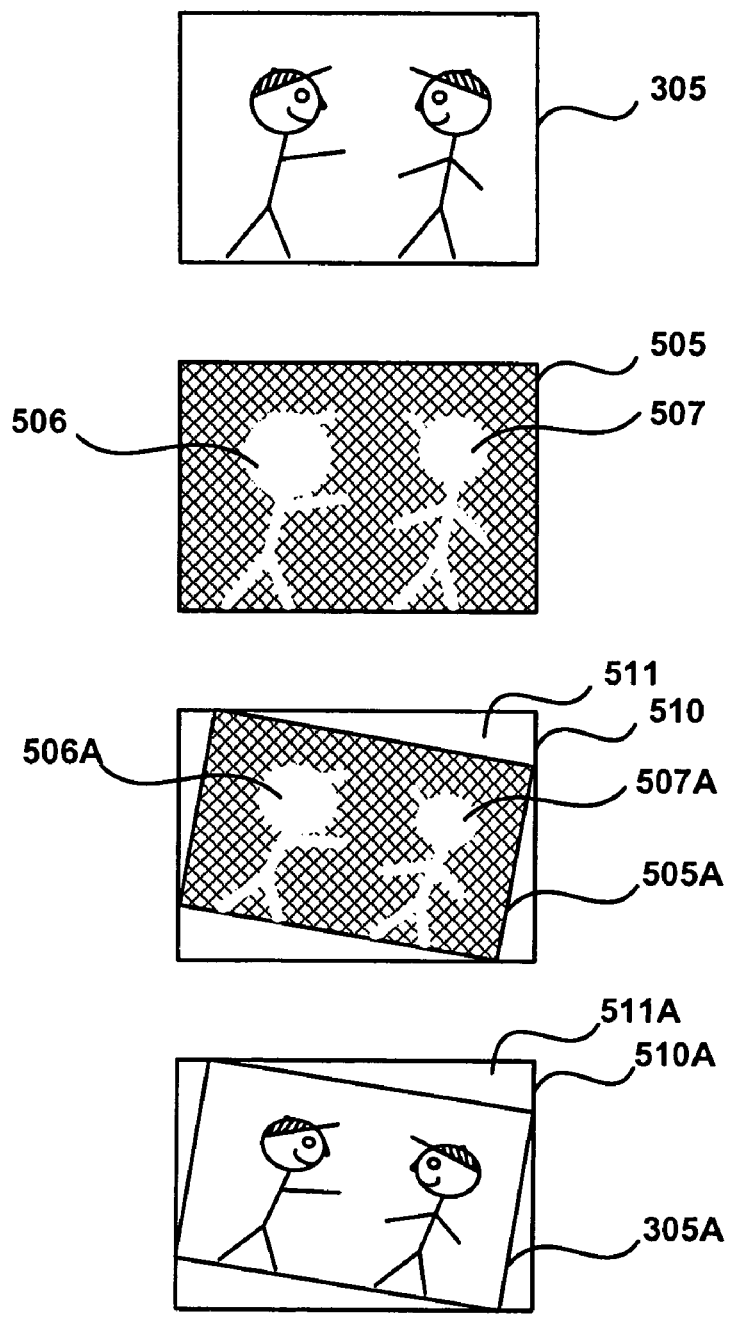
FIG. 5 shows exemplary image manipulations performed during an image loading process, according to one embodiment of the present invention.

FIG. 5 shows exemplary image manipulations performed during an image loading process, according to one embodiment of the present invention. By way of example, in one embodiment, image data receiver 405 receives or acquires image data, such as a bitmap, for an image such as image 305. Image data receiver 405 passes this image data to image saliency generator 410, where a saliency map 505 is generated from the image data. Saliency map 505 is in the form of a grey-scale image, which shows more salient areas as lighter areas and less salient areas as darker areas. In such a saliency map, saliency values may be assigned on a scale, for example from 0 to 255, with the highest saliency represented by a white pixel and a value of 255 and the lowest saliency represented by a black pixel and a value of 0. In saliency map 505 areas 506 and 507 (which were occupied by two people in image 305) are represented as a lighter shade to indicate high salience. The remainder of saliency map 505 is comparatively dark, thus indicating low or no salience except for areas 506 and 507.

Image saliency generator 410 passes image data and saliency data to image scaler 415. Image scaler 415 scales saliency map 505 and image 305 to a uniform area (smaller in this case). Image scaler 415 passes the scaled saliency map and scaled image to image rotator 420. Image rotator 420 rotates the scaled saliency map and scaled image by approximately ten degrees to the right and outputs a scaled and rotated image saliency tile 510 and a scaled and rotated image tile 510A. Image loader 205 provides one or both of these tiles (510, 510A) as outputs. Collage generators, such as additive collage generator 215 and iterative collage generator 220, utilize such image tiles (510 and 510A) to generate collages.

Image tile 510 is comprised of a scaled and rotated image saliency map 505A, which includes scaled down saliency regions 506A and 507A. Image tile 510 is shown with a visible border (for illustrative purposes), which encloses a transparent area 511 that surrounds saliency map 507A. In practice, the border is also transparent. The transparent border and transparent area 511 allow viewing of images or viewing region space that lie immediately beneath image tile 510 in a collage.

Image tile 510A is comprised of a scaled and rotated image 305A. Image tile 510A, is also shown with a visible border (for illustrative purposes), which encloses a transparent area 511A that surrounds image 305A. In practice, the border of tile 510A is also transparent. The transparent border and transparent area 511A allow viewing of images or viewing region space that lie immediately beneath image tile 510A in a collage.

Additional image tiles for the remaining images of FIG. 3 are also generated via this same process used to generate tile 510A. This results in the scaled and rotated images 310A, 315A, 320A, 325A, and 330A, that variously appear, for example, in FIG. 9, FIG. 10, FIG. 13, FIG. 14, FIG. 16, FIG. 17, FIG. 21, and FIG. 22.

Exemplary Methods of Operation

The following discussion sets forth in detail the operation of present invention through description of exemplary embodiments. With reference to FIGS. 7, 12, 23, and 24, flow diagrams 700, 1200, 2300, and 2400 each illustrate exemplary steps used by various embodiments of the present invention. Flow diagrams 700, 1200, 2300, and 2400 include processes that, in various embodiments, are carried out by a processor under the control of computer-readable and computer-executable instructions. The computer-readable and computer-executable instructions reside, for example, in data storage features such as computer usable volatile memory 108, computer usable non-volatile memory 110, and/or data storage unit 112 of FIG. 1. The computer-readable and computer-executable instructions are used to control or operate in conjunction with, for example, processor 106A and/or processors 106A, 106B, and 106C of FIG. 1. Although specific steps are disclosed in flow diagrams 700, 1200, 2300, and 2400, such steps are exemplary. That is, embodiments are well suited to performing various other steps or variations of the steps recited in flow diagrams 700, 1200, 2300, and 2400. It is appreciated that the steps in flow diagrams 700, 1200, 2300, and 2400 may be performed in an order different than presented, and that not all of the steps in flow diagrams 700, 1200, 2300, and 2400 may be performed.

Additive Collage Generation with Occlusion Costing

Figure 6:
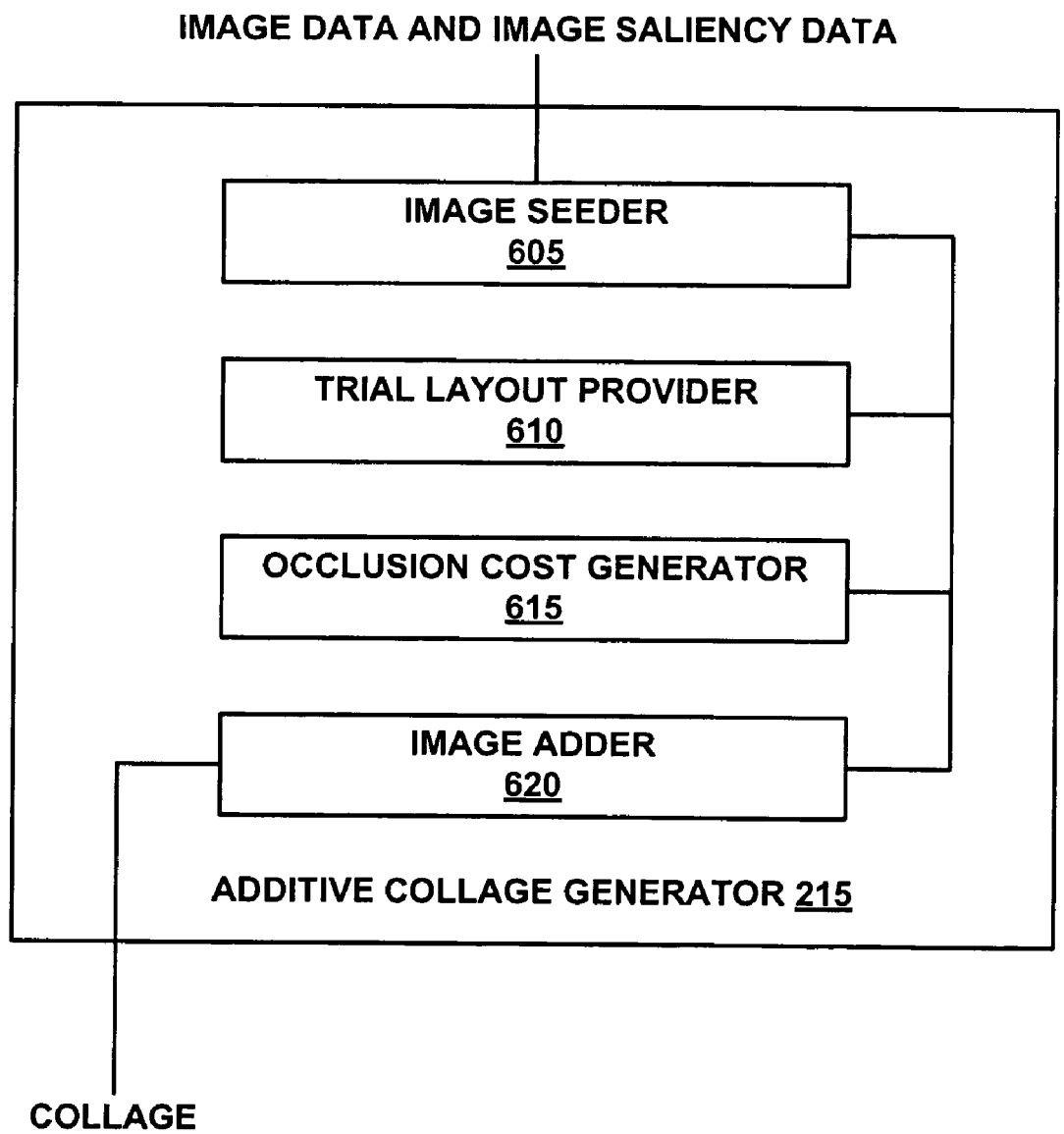
FIG. 6 shows a block diagram of an exemplary additive collage generator, according to one embodiment of the present invention.

FIG. 6 shows a block diagram of an exemplary additive collage generator 215, according to one embodiment of the present invention. As shown, additive collage generator 215 is comprised of an image seeder 605, a trial layout provider 610, an occlusion cost generator 615, and an image adder 620, which are all coupled to one another to allow exchange of information, as required. Image seeder 605 is configured to receive image data and image saliency data, for example in the form of image tiles 510 and 510A, as inputs. Image adder 620 is configured to output information, such as a collage generated from a plurality of images by additive collage generator 215. It is appreciated that the elements of additive collage generator 215 can be coupled or arranged in other configurations that differ from the illustrated configuration, but which accomplish the same actions. Operation of elements of additive collage generator 215 are described in conjunction with appropriate elements of flow diagram 700 of FIG. 7, and images shown in FIG. 8, FIG. 9, and FIG. 10.

Figure 7:
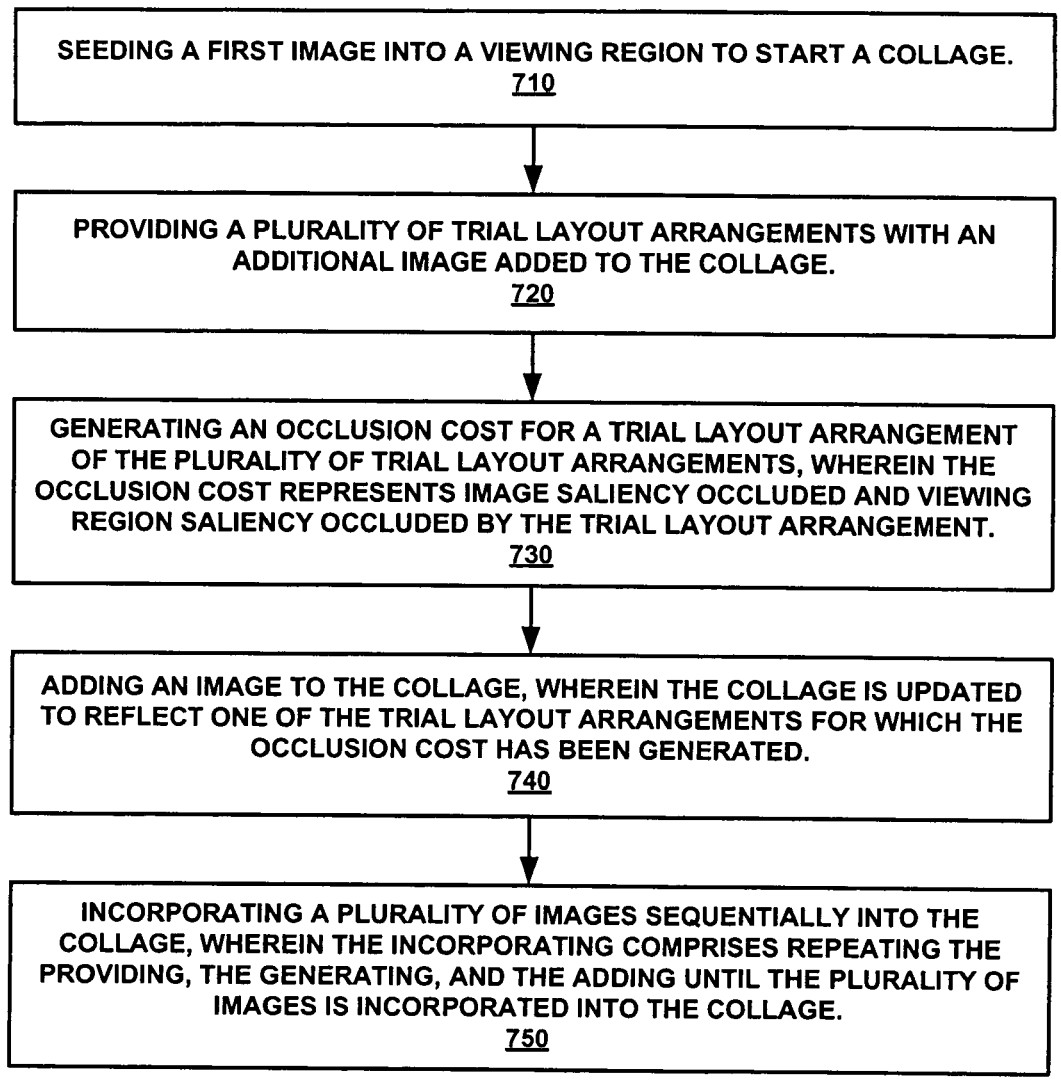
FIG. 7 is a flow diagram of a method of additively generating a collage of images, according to one embodiment of the present invention.

FIG. 7 is a flow diagram 700 of a method, according to one embodiment of the present invention, of additively generating a collage of images. At 710 of flow diagram 700, in one embodiment, a first image is seeded into a viewing region to start a collage. Additive collage generator 215 employs image seeder 605 to seed an initial image, such as image tile 510 or 510A, into a viewing region to start a layout of a collage. Image seeder 605 can seed an image into any portion of a viewing region.

In one embodiment of the present invention, the dimensions of the viewing region are set at a predetermined area by image seeder 605, such as an area 10% greater than the area of all images being collaged within the viewing region. While in another embodiment of the present invention, the dimensions (and area) of the viewing region are varied by image seeder 605. For example, in one embodiment of the present invention, image seeder 605 scales the dimensions (and area) of the viewing region up or down from a predetermined area in proportion to the total area of the images that are collaged within the viewing region. In another example, image seeder 605 sets the size of the viewing region in accordance with user inputs.

In this additive method of generating a collage, the setting of viewing region area and dimensions is not done to force a particular collage efficiency, though it does somewhat assist in that regard. Rather, it is done to increase or decrease the size of the viewing region of the collage and to select the aspect ratio of the collage. Collage efficiency is instead controlled primarily by the saliency that is attributed to the background of the viewing region that the collage is being additively generated upon.

Collage dimensions and area that are set by image seeder 605 do contribute toward the outcome of collage that is generated. For example, predefining a viewing region area that is slightly larger than the area of the images to be collaged allows sufficient room for the creation of the collage. Additionally, additive collage generator 215 generates a collage into an aspect ratio that is approximately consistent with the dimensions of the viewing region. Without predetermined dimensions, the additive method is still operative, but may generate collages with unusual and varied aspect ratios. Further, because image seeder 605 sets the dimensions of the viewing region, an image can be intentionally seeded at a particular location within a defined viewing region. For example, in one embodiment, image seeder 605 seeds an initial image into the center of a viewing region. This forces the collage to generate outward from this initial image toward the edges of the viewing region.

Figure 8:
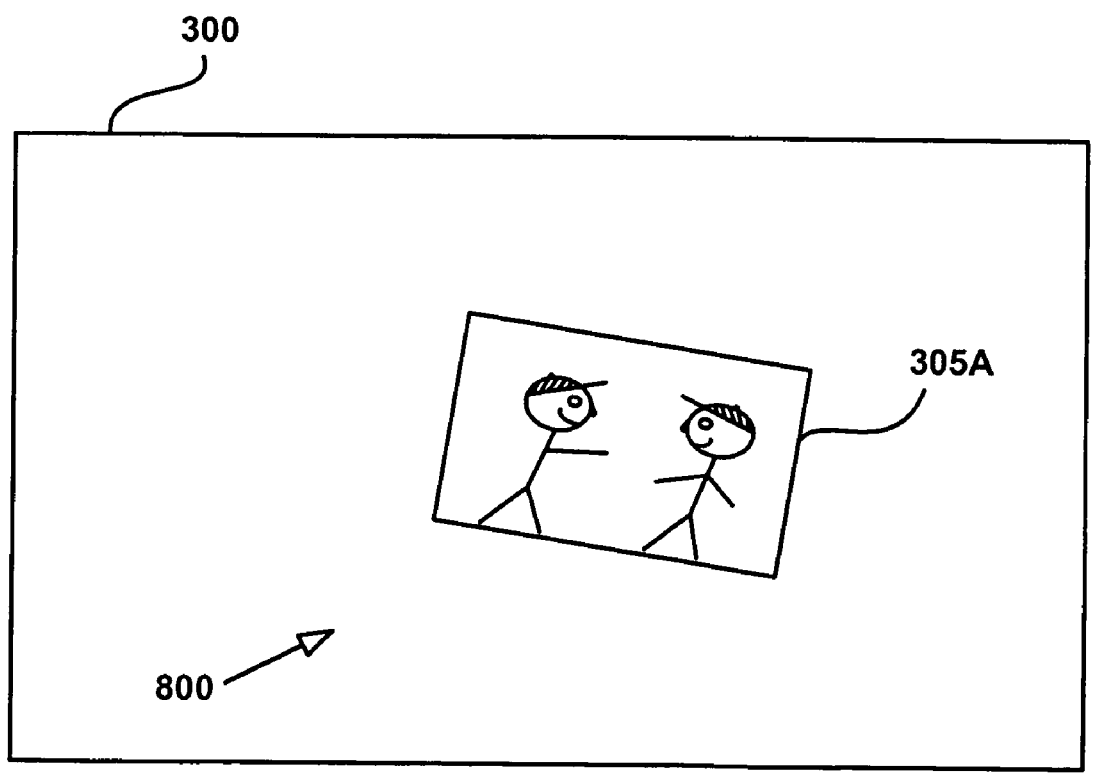
FIG. 8 shows an exemplary image seeded into a viewing region, according to one embodiment of the present invention.

FIG. 8 shows an exemplary image seeded into a viewing region, according to one embodiment of the present invention. Image seeder 605 defines the dimensions of rectangular viewing region 300. In some embodiments, these dimensions are defined in other shapes besides rectangular, such as: square, oval, or circular, among others. In FIG. 8, image seeder 605 has seeded image 305A into the center of viewing region 300 to form the initial image of collage 800. Image 305A is the same scaled and rotated image from image tile 510 (FIG. 5). However, the transparent border and transparent area 511 of image tile 510A are not visible, thus illustrating how a collage will actually appear to a viewer at this interim step of additive generation.

At 720 of flow diagram 700, in one embodiment, a plurality of trial layout arrangements are provided. In each of the trial layout arrangements, an additional image is added to the collage layout. Trial layout provider 610 generates and provides the plurality of trial layout arrangements. Trial layout arranger 610 either sequentially receives the additional image, or else selects an additional image from a plurality of images that are being collaged together within viewing region 300. For example, in one embodiment of the present invention, trial layout provider 610 selects one image from the plurality of images being collaged and uses it to generate a particular plurality of trial layout arrangements. Following this example, this particular plurality of trial arrangements is then passed onward to occlusion cost generator 615.

Figure 9:
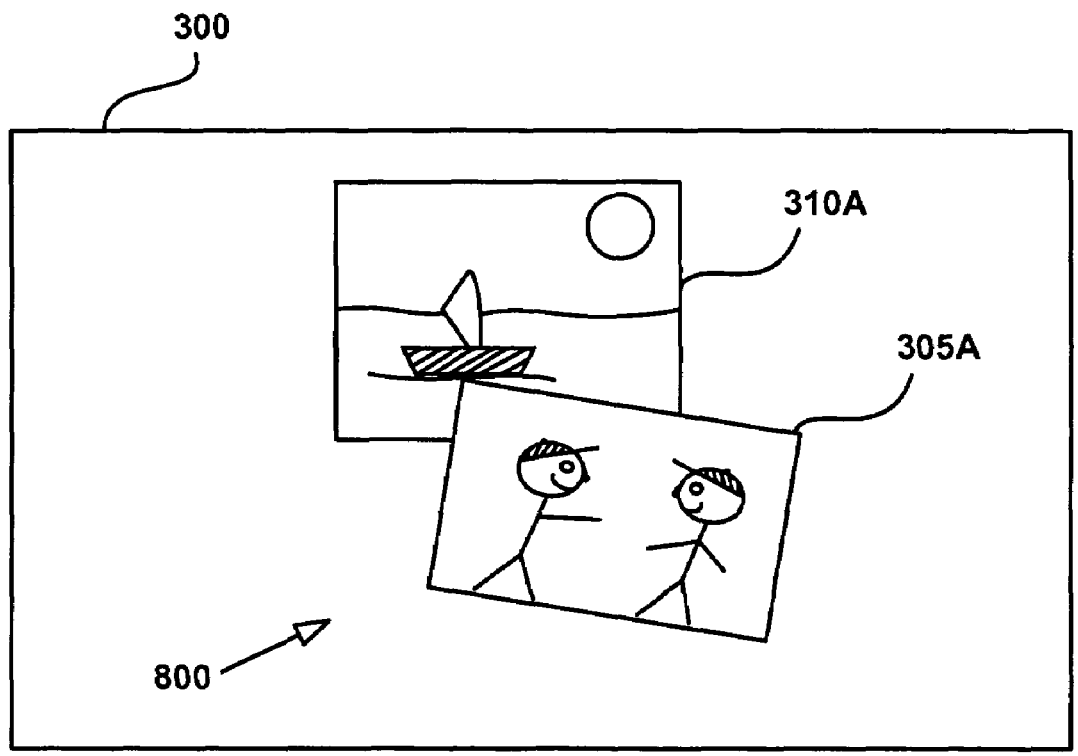
FIG. 9 shows an exemplary image added to a collage layout, according to one embodiment of the present invention.

FIG. 9 shows an exemplary image added to a collage layout, according to one embodiment of the present invention. FIG. 9 is exemplary of one trial layout arrangement out of a particular plurality of trial layout arrangements generated by trial layout provider 610. The trial layout arrangement shown in FIG. 9 is comprised of an additional image 310A added to collage 800 within viewing region 300. Note that the image 305A remains in the same two-dimensional position as shown previously in FIG. 8. In other trial layouts of this particular plurality of trial layouts, the two-dimensional position of image 305A will remain fixed, while the two-dimensional position and z-ordered location of the additional image (310A in this case) will be varied. It follows then that in one embodiment, some of the plurality of trial layout arrangements will be comprised of a plurality of two-dimensional locations of the additional image z-ordered above the existing collage, and some of plurality of the trial layout arrangements will be comprised of a plurality of two-dimensional locations of the additional image z-ordered below the existing collage.

The total number of the plurality of trial layouts is predetermined in one embodiment. While in another embodiment, the number of trial layouts is variable, for example, in response to a user input to shorten the collage generation timeline. Likewise, in some embodiments with reduced computing power, such as, for example, digital cameras, fewer trial layout arrangements are generated to speed collage generation.

At 730 of flow diagram 700, in one embodiment, an occlusion cost is generated for a trial layout arrangement of the plurality of trial layout arrangements. The occlusion cost represents image saliency occluded and viewing region saliency occluded by the trial layout arrangement. Occlusion cost generator 615 generates an occlusion cost for this trial layout arrangement. In one embodiment, occlusion cost generator 615 calculates an occlusion cost for some portion, such as ten percent or one hundred percent of a particular plurality of trial layout arrangements.

Occlusion cost generator 615 attributes a saliency to the internal area of the viewing region (such as viewing region 300) that the collage is being generated within. In one embodiment, this viewing region salience is predetermined, while in another embodiment this viewing region salience is controlled through occlusion cost generator 615 via user input. In one embodiment, for example, occlusion cost generator 615 attributes a uniform predetermined salience to each pixel in the entire area encompassed by a viewing region. The precise pixel value for the viewing region saliency gives fine-level control of the aggressiveness of the overlap of the collage, and the resultant efficiency. For example, in one embodiment, where saliency in image saliency maps varies from 0 (no saliency) to 255 (highest saliency), occlusion cost generator 615 can set the saliency of each pixel in a viewing region to a value of 10 (low saliency). Attributing a higher uniform saliency to the pixels in the viewing region will result in more efficient collages that have more aggressive overlap and cover less of the viewing region. Similarly, attributing a lower uniform salience to the pixels in the viewing region will result in less efficient collages that have less aggressive overlap and cover more of the viewing region. Table 1 (previously shown) shows one equation that occlusion cost generator 615 can use to generate an occlusion cost which represents image saliency occluded and also represents viewing region saliency occluded.

TABLE 5

Example Equation for Calculation of Fractional Visible Saliency of a Trial Layout Arrangement $$F_s = \frac{\sum\limits_{\text{All Images}} S_v + \sum\limits_{\text{Background}} S_v}{\sum\limits_{\text{All Images}} S_T}$$

$F_S$ = fraction of visible saliency in a trial layout arrangement
$S_V$ = the summation of visible pixels
$S_T$ = the total of all visible pixels in a trial layout arrangement The occlusion cost is the reciprocal of the fractional saliency that is visible in a particular layout. Table 5 shows one equation that occlusion cost generator 615 can use to generate the fractional saliency that is visible in a particular trial layout arrangement within a viewing region. The fractional saliency varies between zero and one, with larger numbers indicating more saliency visible. Based on this fractional visible saliency calculation, occlusion cost generator 615 generates an occlusion cost that is consistent with the occlusion cost calculated by the equation shown in Table 1.

The equations shown in Tables 1 and 5 are exemplary, and it is appreciated that other calculations can be utilized which calculate an occlusion cost for a trial layout arrangement, wherein the occlusion cost represents image saliency occluded and viewing region saliency occluded by the trial layout arrangement. Occlusion cost generator 615 passes generated occlusion costs for trial layout arrangements to image adder 620.

At 740 of flow diagram 700, in one embodiment, an image is added to the collage. In one embodiment, when the image is added to the collage, the collage is updated to reflect one of the trial layout arrangements for which an occlusion cost was calculated. Image adder 620 adds new images to the collage. In one embodiment, image adder 620 compares the occlusion costs for each of the trial layout arrangements that it receives occlusion costs for. Based on this comparison, image adder 620 selects the trial layout arrangement with the lowest occlusion cost. Image adder 620 then adds the additional image, from the lowest cost trial layout arrangement, to the collage. The new image (additional image) is added to the collage in the same z-ordered location and two-dimensional position that the additional image appears at within the lowest cost trial layout arrangement.

At 750 of flow diagram 700, in one embodiment, the remaining images of a plurality of images to be collaged are additively incorporated into the collage by repeating blocks 720, 730, and 740 until all images from the plurality of images are added to the collage in a sequential fashion.

Figure 10:
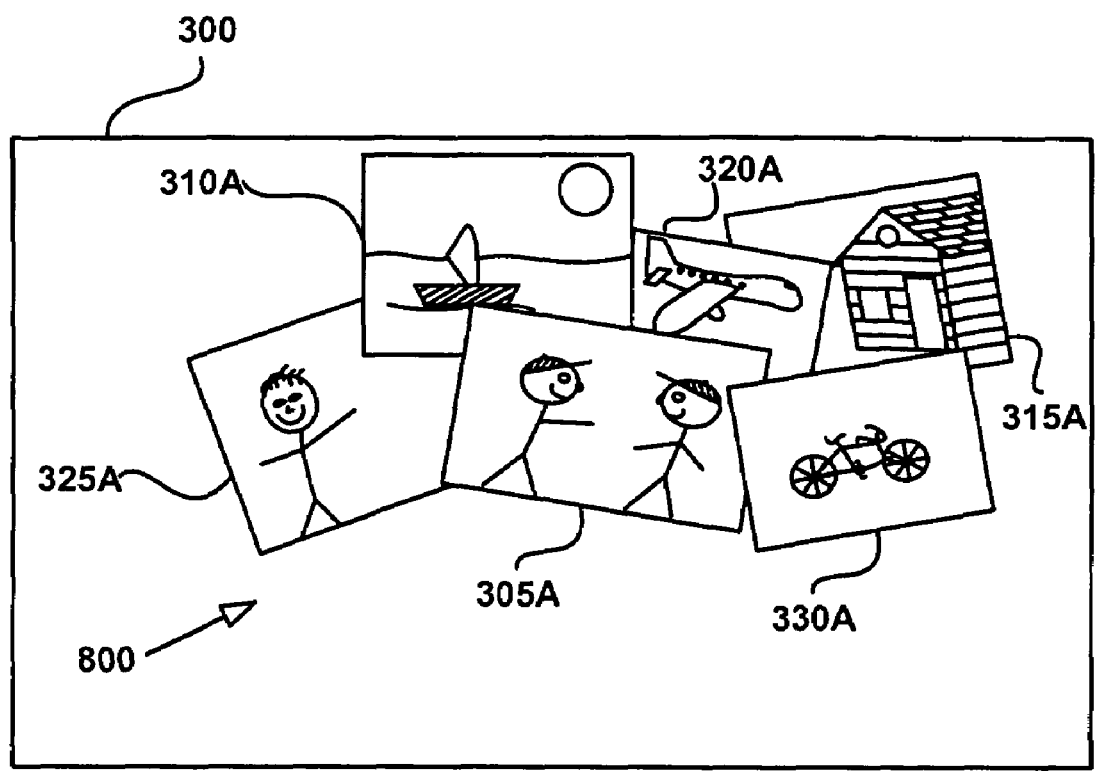
FIG. 10 shows an exemplary collage created according to one embodiment of the present invention.

FIG. 10 shows an exemplary collage 800 created according to one embodiment of the present invention. FIG. 10 shows an exemplary resulting collage that has been additively generated from the plurality of images (305, 310, 315, 320, 325, and 330) shown in FIG. 3. Each image has been converted into an image tile through the previously described process. The images tiles have then been additively collaged into viewing region 300. The collage is comprised of scaled and rotated images 305A, 310A, 315A, 320A, 325A, and 330A that are a part of the previously described image tiles. Note that in FIG. 10, there is a fairly aggressive overlap of images. This is due to a high value being set for the salience of viewing region 300. Selecting a lower viewing region salience value will result in images spaced more broadly around viewing region 300. Selecting a viewing region of smaller dimensions will result in less empty space surrounding collage 800 with viewing region 300.

Iterative Collage Generation with Occlusion Costing

Figure 11:
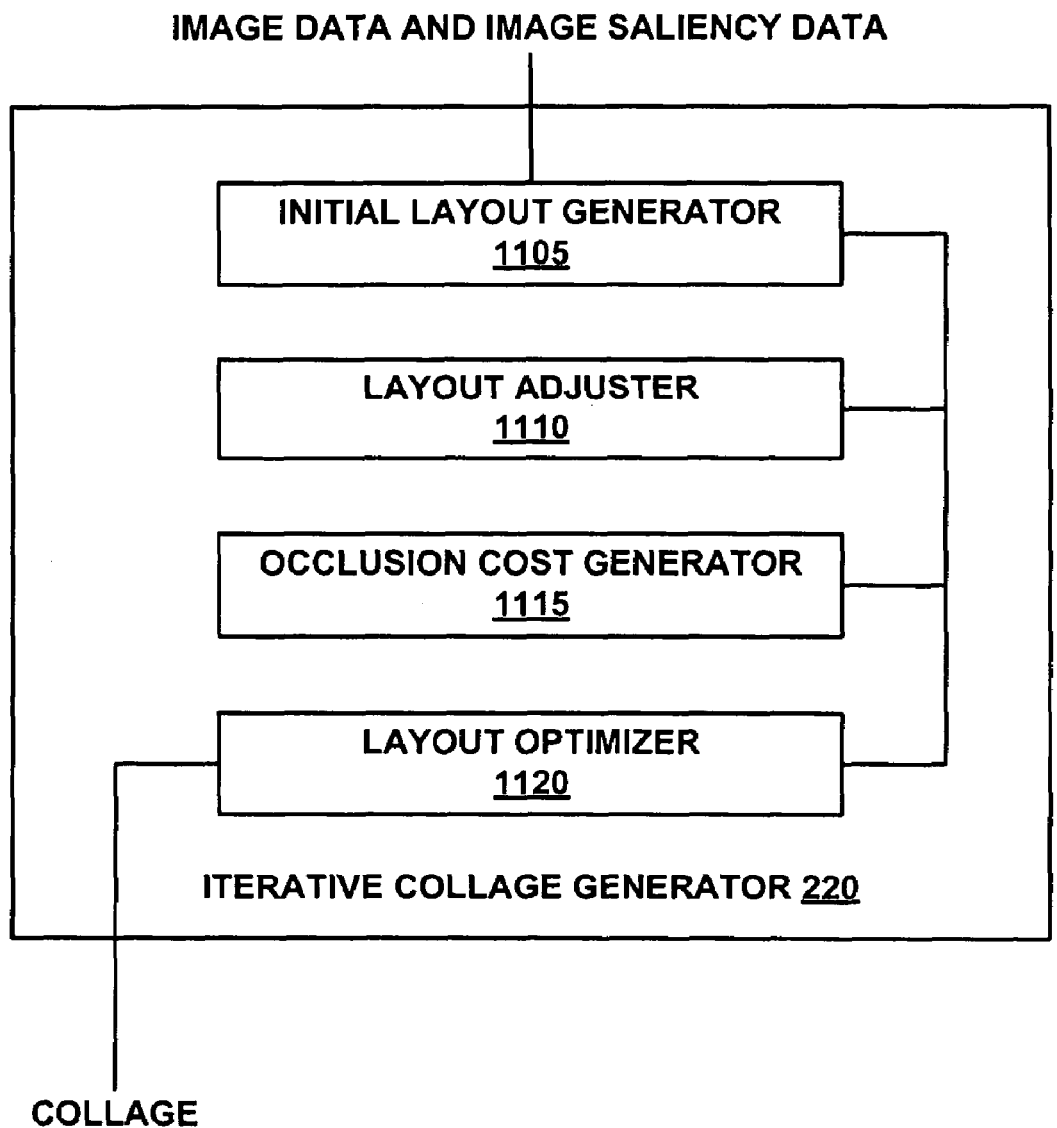
FIG. 11 is a block diagram of an iterative collage generator, according to one embodiment of the present invention.

FIG. 11 is a block diagram of an iterative collage generator 220, according to one embodiment of the present invention. As shown, iterative collage generator 220 is comprised of an initial layout generator 1105, a layout adjuster 1110, an occlusion cost generator 1115, and a layout optimizer 1120, which are all coupled to one another to allow exchange of information, as required. Initial layout generator 1105 is configured to receive image data and image saliency data, for example in the form of image tiles 510 and 510A, as inputs. Layout optimizer 1120 is configured to output information, such as a collage generated from a plurality of images by iterative collage generator 220. It is appreciated that the elements of iterative collage generator 220 can be coupled or arranged in other configurations that differ from the illustrated configuration, but which accomplish the same actions.

In one embodiment, initial layout generator 1105 is for generating an initial collage layout from a plurality of images. In some embodiments where an initial collage layout is provided as an input, initial layout generator 1105 is not used. In one embodiment, layout adjuster 1110 is for incrementally adjusting collage layouts. In one embodiment, occlusion cost generator 1115 is for calculating occlusion costs for collage layouts, such as the incrementally adjusted collage layouts. In one embodiment, layout optimizer 1120 is for selecting an incrementally adjusted layout with a lowest occlusion cost. Further operations of these elements of iterative collage generator 220 are described in conjunction with appropriate elements of flow diagram 1200 of FIG. 12, and the images shown in FIG. 13, FIG. 14, FIG. 15, FIG. 16, and FIG. 17.

Figure 12:
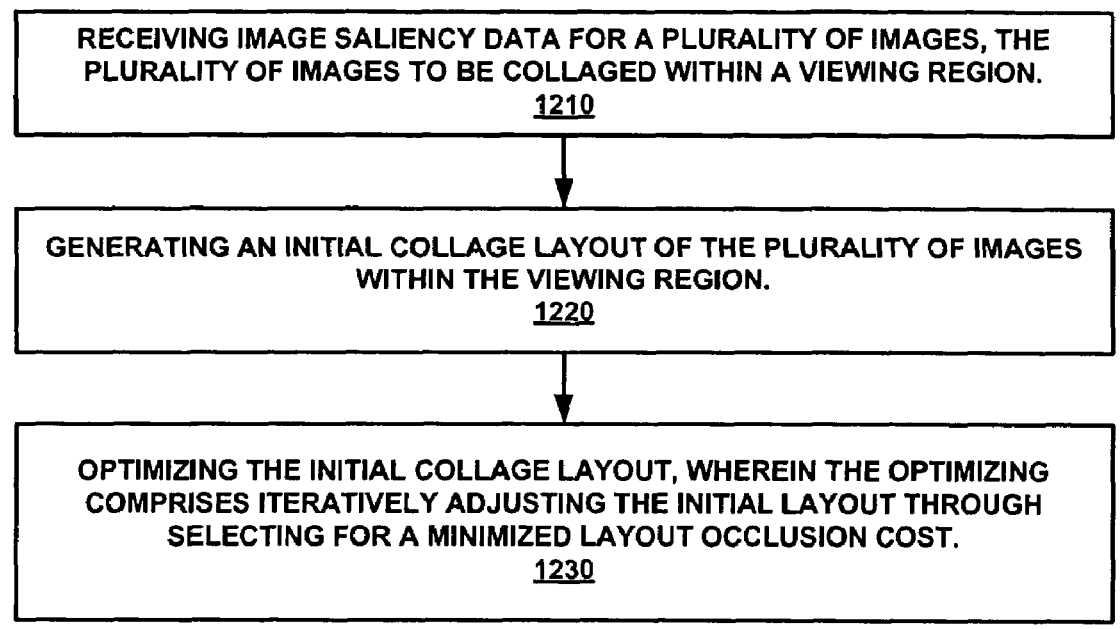
FIG. 12 is a flow diagram of a method of iteratively generating a collage of images, according to one embodiment of the present invention.

FIG. 12 is a flow diagram 1200 of a method, according to one embodiment of the present invention, of iteratively generating a collage of images. At 1210 of flow diagram 1200, in one embodiment, image saliency data is received for a plurality of images which are to be collaged within a viewing region. Iterative collage generator 220 employs initial layout generator 1105 to receive this image saliency data. In some embodiments of the present invention, initial layout generator 1105 receives a variety of image information comprised of image data such as: image bitmaps, image saliency data, and image tiles (such as image tiles 510 and 510A (FIG. 5)).

At 1220 of flow diagram 1200, in one embodiment, an initial collage layout is generated within a viewing region from the plurality of received images. In one embodiment, initial layout generator 1105 generates this initial collage layout from a plurality of received image tiles, such as image tiles 510 or 510A, by placing the image tiles within a defined viewing region. Initial layout generator 1105 determines the dimensions of the viewing region (which remain constant throughout the iterative collage generation process) by the use of predefined or user-selected values for aspect ratio and collage efficiency. For example, in one embodiment, in response to a user input, initial layout generator 1105 generates a rectangular viewing region with the aspect ratio of 1.33:1 and an efficiency of 1.15. This means that the total area of all images collaged within the generated viewing region will be 15% larger than the area of the total area of the collage.

In one embodiment, initial layout generator 1105 lays out images such as image tiles according to a pattern, grid, or some other structured means. FIG. 3 is exemplary of an initial collage layout of a plurality of images (305, 310, 315, 320, 325, and 330) that is generated according to a pattern. Initial layout generator 1105 has generated the initial collage layout shown in FIG. 3 by placing images within viewing region 300 according to a pattern. In another embodiment, initial layout generator places images such as image tiles in a random or pseudo-random fashion within a viewing region to generate an initial collage layout.

Figure 13:
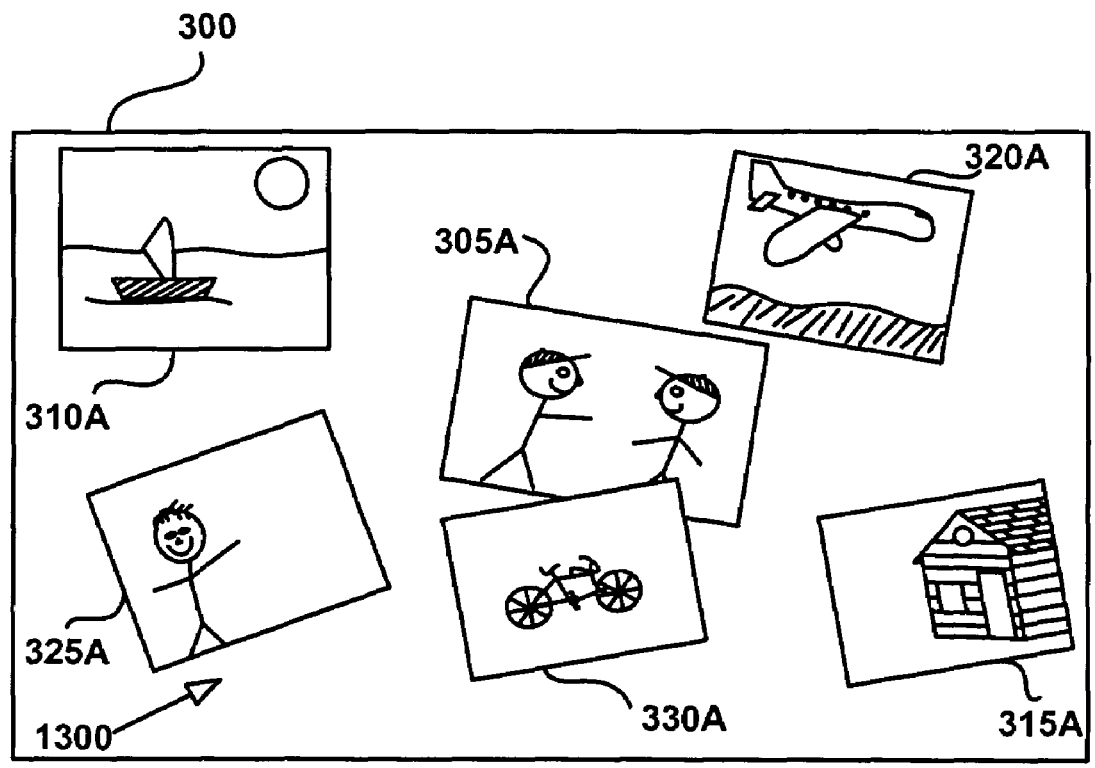
FIG. 13 shows an exemplary initial collage layout of a plurality of images, according to one embodiment of the present invention.

FIG. 13 shows an exemplary initial collage layout of a plurality of images, according to one embodiment of the present invention. In FIG. 13, initial collage generator 1105 has randomly placed images 305A, 310A, 315A, 320A, 325A, and 330A within viewing region 300 to generate an initial collage layout 1300 of this plurality of images. As previously described, each of the images (305A, 310A, 315A, 320A, 325A, and 330A) is a part of an image tile, such as tile 510A, and thus has a preset image scale and rotation that is maintained throughout the collage generation process. This preset scale and rotation is maintained in spite any of changes to the x-y position or z-ordering of images which may be imposed on collage 1300 as part of the iterative collage generation process.

At 1220 of flow diagram 1200, in one embodiment, the initial collage layout is optimized. The optimizing comprises iteratively adjusting the initial layout through selecting for a minimized occlusion cost. In one embodiment of the present invention, this iterative adjusting and selecting is continued until a predetermined efficiency is reached for the collage layout. In one embodiment of the present invention, this iterative adjusting and selecting is continued until a predetermined number of adjustment iterations have been achieved, such as, for example, 100 iterations. Layout adjuster 1110, occlusion cost generator 1115, and layout optimizer 1120 work in concert to carry out this optimization of the initial collage layout. Table 6 shows an exemplary pseudocode structure describing a method for performing the iterative optimization of the initial collage layout.

TABLE 6

Exemplary Pseudocode Structure for Iteratively Optimizing an Initial Collage Layout

```
Create "pre-score" and "post-score" variables
Create Initial Layout
While pre-score is greater than post-score
{
    Optimize Z-order
    Flatten layout
    Set pre-score equal to layout score
    For all images in the layout
    {
        Flatten layout
        Score Layout (no movement)
        For all four directions (up, down, left, right)
        {
            Move image by set distance
            Flatten layout
            Score layout
        }
        Select layout with best score
        Finalize image motion
    }
    Flatten Layout
    Set post-score equal to layout score
```

TABLE 6-continued

Exemplary Pseudocode Structure for Iteratively Optimizing an Initial Collage Layout

```
}
Output Collage
```

In one embodiment, occlusion cost generator 1115 calculates an occlusion cost for the initial collage layout from the ratio of the total saliency that exists in all tiles to the fractional saliency that is visible in the initial collage layout. This second portion, the "fractional saliency that is visible in the initial collage layout," is calculated from a "flattened" layout of the collage. Flattening the collage layout can be thought of as taking a snap shot of the collage as it appears to a viewer. However, rather than using the full color image data for each image (for example image data associated with tile 510A) the snapshot is instead rendered using the corresponding saliency map for each image in the collage (for example using saliency data for image tile 510 instead of image data for image tile 510A). The saliency for this flattened collage layout is then calculated by adding up the saliency that is visible ($S_V$) in the snap shot.

Table 7 shows an exemplary equation that is used by occlusion cost generator 1115 to calculate the occlusion cost of a collage layout. The occlusion cost of this initial layout is then kept as a "pre-score" by layout optimizer 1120. This pre-score is used to evaluate future collage layouts as better or worse than the initial layout.

TABLE 7

Example Equation for Calculation of Fractional Visible Saliency in a Collage Layout Iteration $$F_s = \frac{\sum_{\text{AllTiles}} S_V}{\sum_{\text{AllTiles}} S_T}$$

Where:

$$S_V = \sum_{\text{VisiblePixels}} S_{V(x,y)}$$

and $$S_T = \sum_{\text{TotalPixels}} S_{V(x,y)}$$

As previously described, an occlusion cost is a reciprocal function of the fraction of visible saliency in a collage layout. The relevant variables in the equations of Table 7 are the visible saliency, $S_V$, and the total saliency $S_T$. $S_T$ is the total saliency added across all images (such as image tiles 510 and 510A of FIG. 5). $S_V$ is obtained for the same collage layout by adding the total saliency visible across all image tiles after the flattening process has been performed. Since flattening will generally result in the occlusion of some saliency in some image tiles, $S_V$ will generally be less than $S_T$ and the corresponding occlusion cost will be less than one.

After occlusion cost generator 1115 calculates an occlusion cost "pre-score" of the initial collage layout, a Z-ordered optimization of the initial layout is performed. In the most general case, this involves a calculation of the occlusion cost for every permutation of images within the z-order. However, to reduce computational complexity and/or calculation time, in some embodiments, the occlusion cost is only calculated for a subset of the z-ordering permutations.

For example, in one embodiment of the present invention, the layout occlusion costs are calculated for z-ordering an image in an image tile above and below all other images of the plurality of images in a collage. This z-ordered optimization is a straightforward process. Layout adjuster 1110 adds each image, such as an image tile, to the collage in turn, in one of two positions: either at the top of the z-order, (in front of any other images) or at the bottom of the z-order (below any other images). Occlusion cost generator 1115 then calculates the occlusion cost for each position of the image tile, in the manner previously described. Layout optimizer 1120 selects the layout with the lowest cost as the optimal z-order position for the image tile. The collage layout is then updated to reflect a lowest layout occlusion cost based on the calculated occlusion costs. This z-ordering, calculating and updating is then repeated for each of the images in the plurality of image tiles within the collage. The z-ordering is complete when all image tiles have been ordered in this manner. Likewise, a similar optimization process or z-ordering, calculating, and updating, is followed in embodiments of the present invention which calculate occlusion costs for a larger set of z-order permutations of images within the viewing region.

Figure 14:
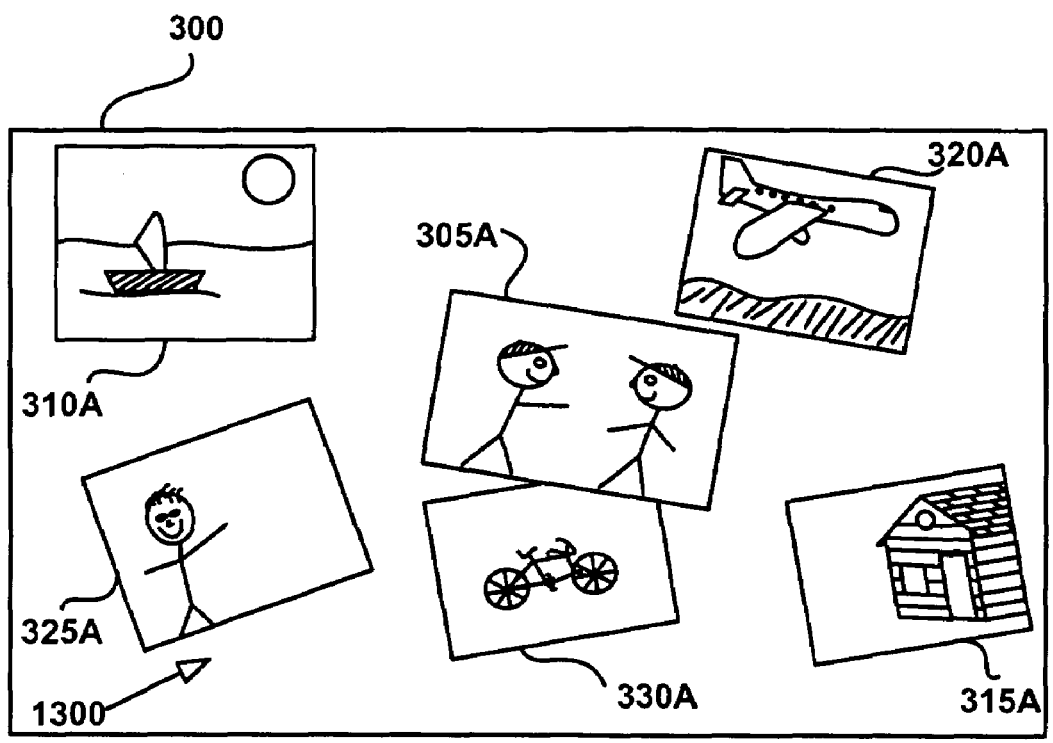
FIG. 14 shows an exemplary z-ordering of in image to minimize an occlusion cost of a collage layout, according to one embodiment of the present invention.

FIG. 14 shows an exemplary z-ordering of an image to minimize an occlusion cost of a collage layout, according to one embodiment of the present invention. All elements of collage layout 1300 shown in FIG. 14 are identical to collage layout 1300 shown in FIG. 13, except that image 305A has been optimally z-ordered above image 330A in a manner that eliminates the occlusion of image saliency (lower half of the person on the right of image 305A) that was taking place in FIG. 13.

After z-ordering has been performed, occlusion cost generator 1115 flattens the collage layout, and determines the occlusion cost of the layout. As shown by the pseudocode in Table 6, this occlusion cost for the z-ordered layout then replaces the pre-score that was previously stored.

A similar iterative process is then followed to optimize the two-dimensional x-y position of each image (such as an image tile) within the viewing region and select a collage layout with a lowest two-dimensionally adjusted layout occlusion cost. Once again, layout adjuster 1110, occlusion cost generator 1115, and layout optimizer 1120 work in concert to slightly nudge each image tile two-dimensionally, and iteratively select an optimal two-dimensional position of each image from occlusion costs calculated after each nudging operation. In one embodiment, each image tile is nudged slightly in four directions (up, down, left, and right) from an original position.

For example, layout adjuster 1110 makes a slight adjustment to the x-y position of a single image. Occlusion cost generator 1115 then flattens the adjusted layout and calculates an occlusion cost for this slightly two-dimensionally adjusted layout. Layout optimizer 1120 then compares the occlusion cost of this slightly adjusted layout to the score of a stored layout. Layout optimizer 1120 updates the stored layout to reflect the adjusted layout if the adjusted layout has a smaller occlusion cost. This updated layout then becomes the operative layout to which layout adjuster makes the next slight nudging adjustment. The iterative nudging, flattening, calculating, and updating continue until each image tile of the plurality of collaged image tiles has been optimally nudged.

Figure 15:
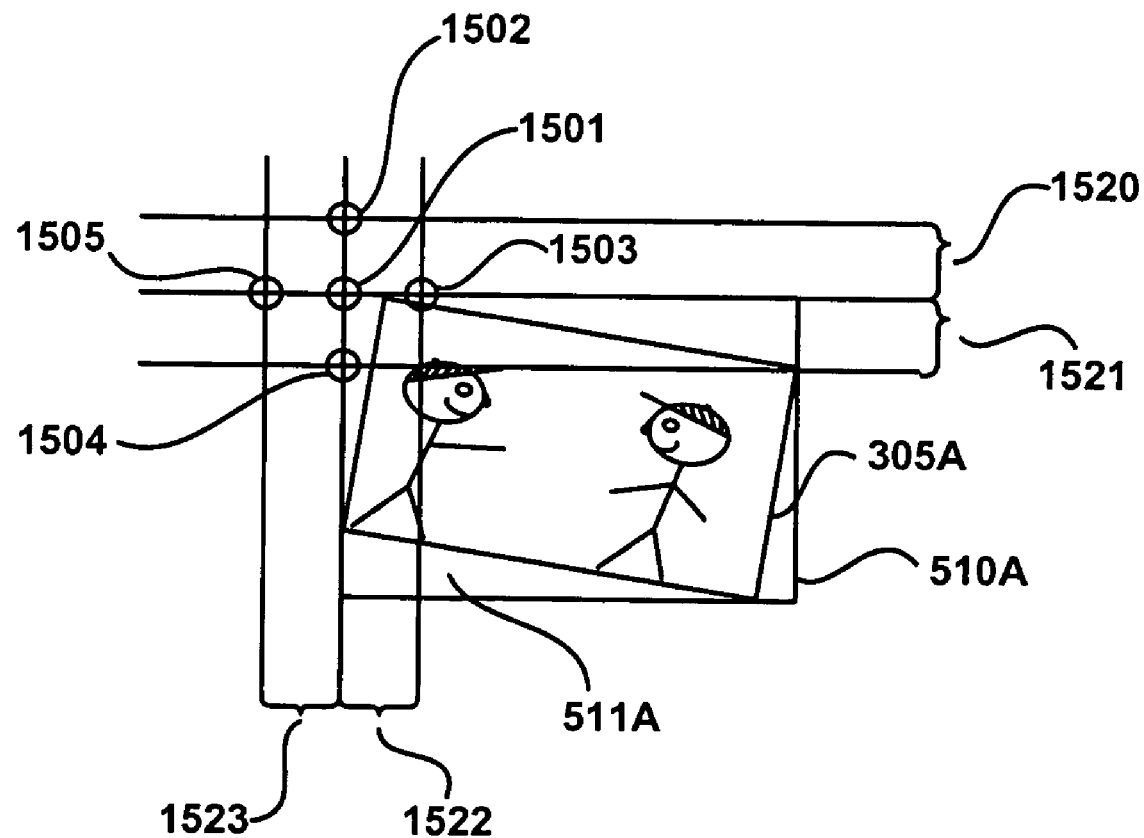
FIG. 15 shows exemplary two-dimensional nudging possibilities for an exemplary image, according to one embodiment of the present invention.

FIG. 15 shows exemplary two-dimensional nudging possibilities for an exemplary image, according to one embodiment of the present invention. In FIG. 15, image tile 510A is once again visibly displayed, surrounding transparent area 511 and image 305A. Position 1501 represents the original position of the upper left corner of image tile 510A. Positions, 1502, 1503, 1504, and 1505 represent slight distances that image adjuster 1110 can nudge image tile 510A during the nudging process. For example, in one embodiment, position 1502 is a slight distance 1520, such as ten pixels, above original location 1501. Following this example, position 1503 is a slight distance 1522 of ten pixels to the right of original location 1501; position 1504 is a slight distance 1521 of ten pixels below original location 1501; and position 1505 is a slight distance 1523 of ten pixels to the left of original location 1501. Occlusion cost generator 1115 generates an occlusion cost for the original location and each of the possible nudged locations 1502, 1503, 1504, and 1505. Layout optimizer 1120 performs comparisons and selects the nudged location that presents the lowest occlusion cost. It is appreciated that in some embodiments, a layout can be nudged in fewer directions or more directions, or a greater or lesser distance than shown in FIG. 15.

Figure 16:
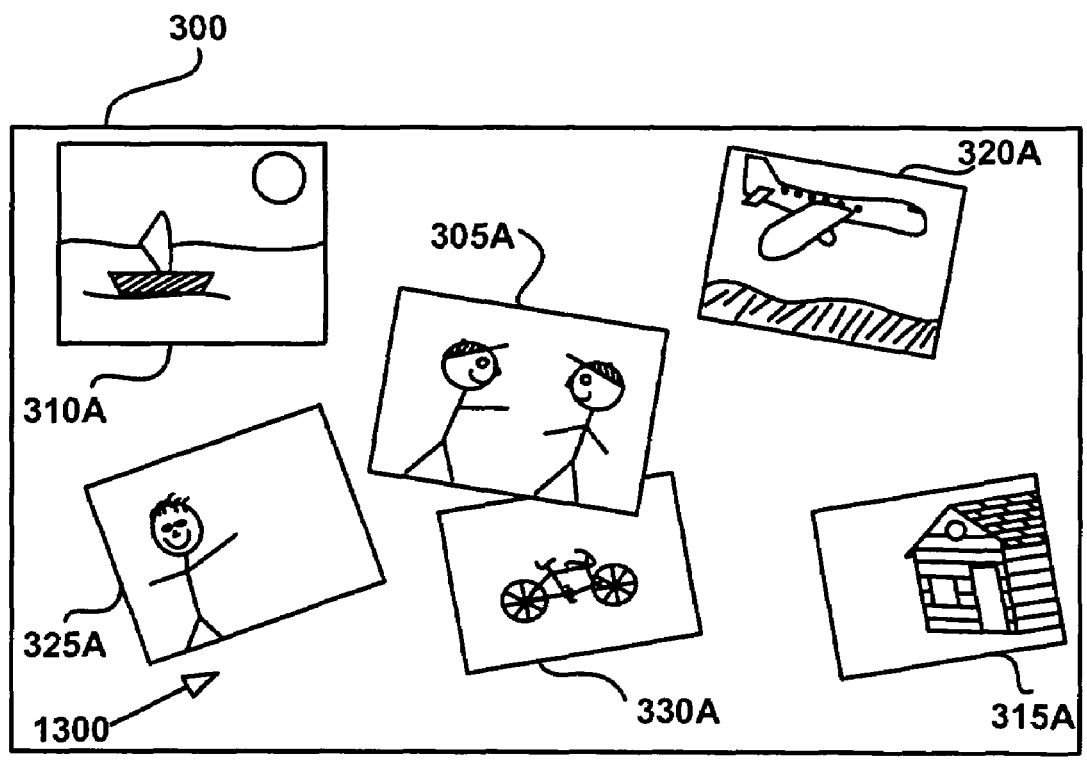
FIG. 16 shows an exemplary image nudging to minimize an occlusion cost of a collage layout, according to one embodiment of the present invention.

FIG. 16 shows an exemplary image nudging to minimize an occlusion cost of a collage layout, according to one embodiment of the present invention. All elements of collage 1300 shown in FIG. 16 are identical to collage layout 1300 shown in FIG. 14, except that image 305A has been nudged to a two-dimensional position slightly to the left of its previous position above image tile 330A.

In one embodiment, the selective adjustment operations of z-ordering and nudging, described above, are repeated until a predetermined or optimal occlusion cost is reached by a collage that is iteratively selected. In another embodiment, the selective adjustment operations of z-ordering and nudging, described above, are repeated until a predetermined number of such adjustment iterations have been achieved. An example of such a predetermined number of iterations is 100. This is useful for limiting the amount of time and/or computational resources spent iteratively generating a collage. It is also useful as a failsafe exit criteria in the case where a user selected collage efficiency level is unachievable for a particular plurality of images. In another embodiment, the selective adjustment operations of z-ordering and nudging continue until the total occlusion cost cannot be further lowered by nudging an image in any direction or changing the z-order location of any image.

Figure 17:
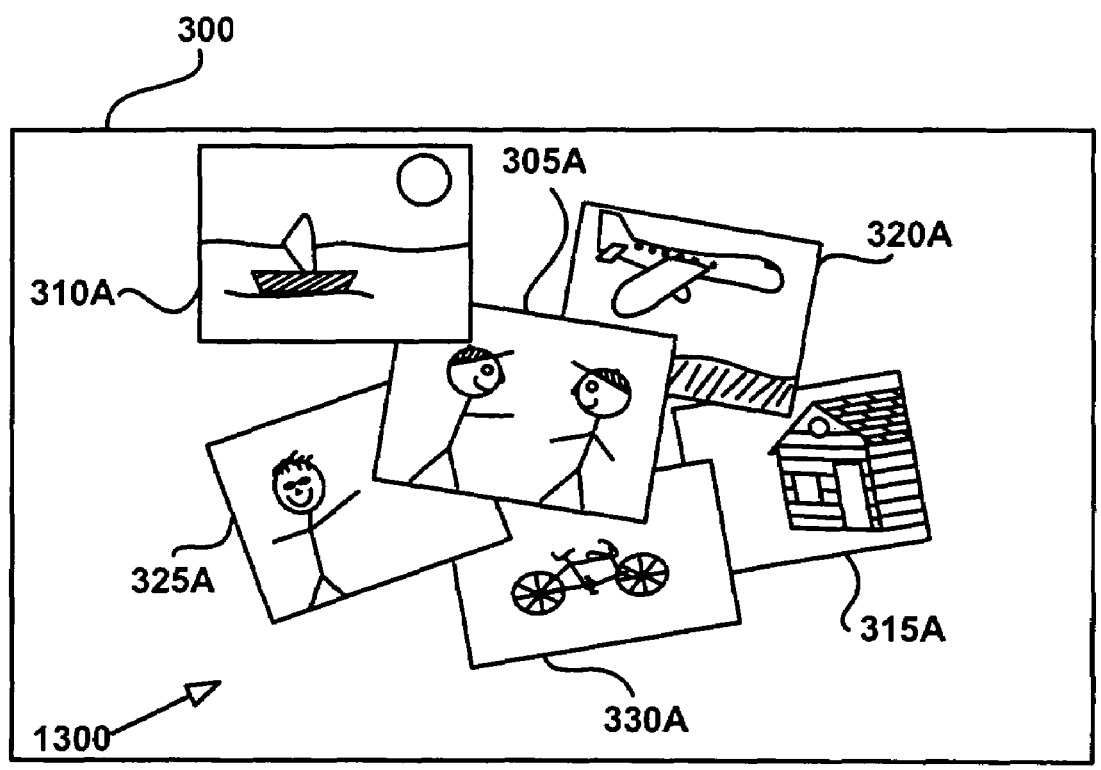
FIG. 17 shows an exemplary collage created according to one embodiment of the present invention.

FIG. 17 shows an exemplary collage created according to one embodiment of the present invention. FIG. 17 shows an exemplary resulting collage that has been iteratively generated from the plurality of images (305, 310, 315, 320, 325, and 330) shown in FIG. 3. The collage shown in FIG. 17 is the result of numerous iterations of the selective adjustment operations of z-ordering and nudging that are described above. Each image has been converted into an image tile through the previously described process. The images tiles have then been iteratively collaged into viewing region 300. The collage is comprised of scaled and rotated images 305A, 310A, 315A, 320A, 325A, and 330A that are a part of the previously described image tiles. Note that in FIG. 17, there is a fairly aggressive overlap of images. This is due to a high efficiency set for the iterative generation of collage 1300. Selecting a lower efficiency will result in images being overlapped less aggressively and spaced more broadly around viewing region 300.

Exemplary System for Templated Collage Generation with Occlusion Costing

Figure 18:
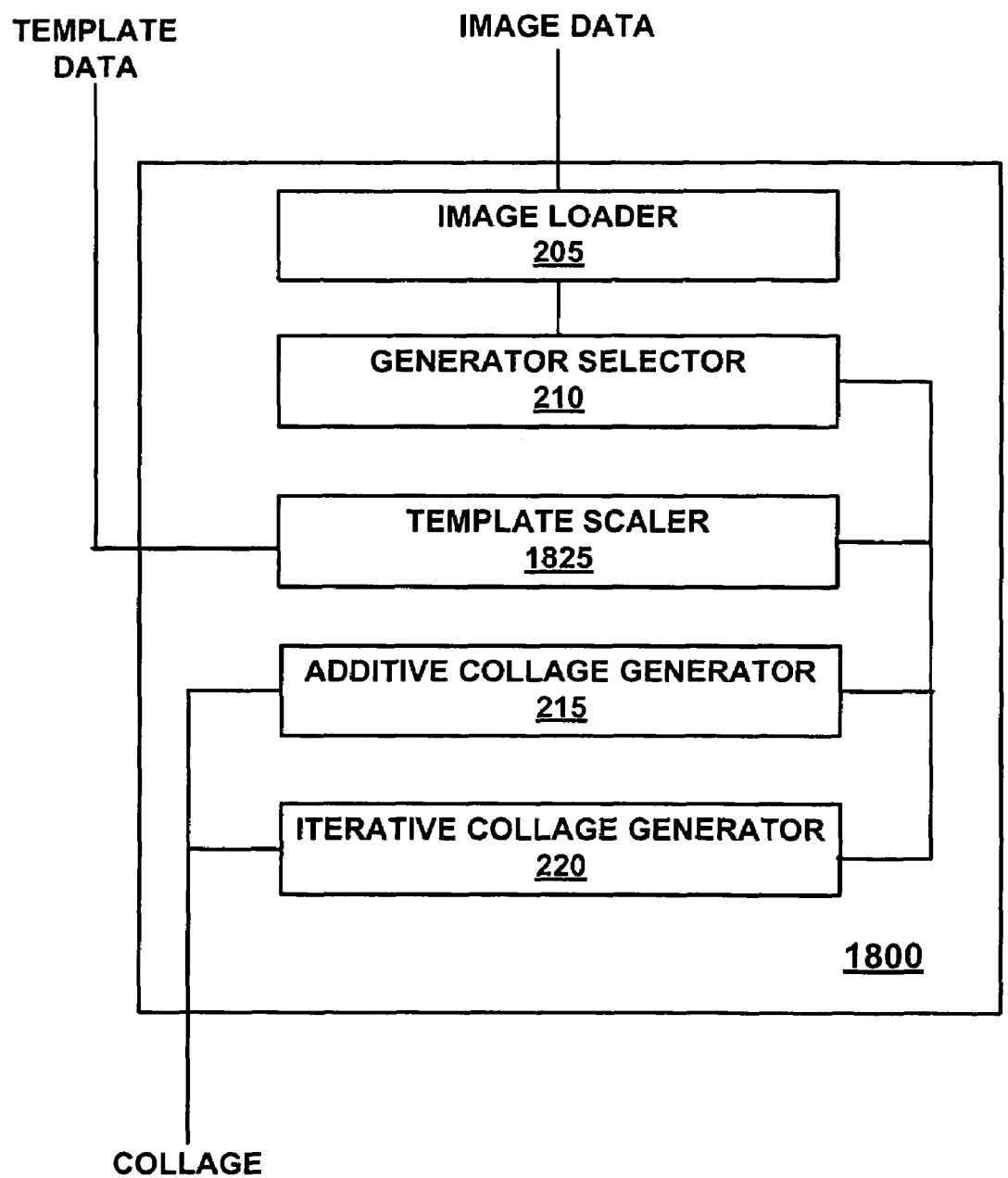
FIG. 18 is a block diagram of an exemplary system for templated collage generation, according to the present invention.

FIG. 18 is a block diagram of an exemplary system 1800 for collage generation, according to the present invention.

System 1800 automatically generates a templated collage of images as an output from inputs of image data of digital images and template data. System 1800 utilizes one or more occlusion costing techniques, such as the additive and iterative occlusion costing techniques described herein. System 1800 is comprised of an image loader 205, a generator selector 210, an additive collage generator 215, and an iterative collage generator 220, which were all previously described in conjunction with system 200 of FIG. 2. System 1800 is additionally comprised of template scaler 1825 which is coupled to generator selector 210, additive collage generator 215, and iterative collage generator 220. Elements 205, 210, 215, and 220 operate substantially in the fashion previously described, except for the differences noted in the discussion below.

Image loader 205 operates as previously described in FIG. 2 and FIG. 14, and additionally provides image data as required to template scaler 1825 via generator selector 210. As previously described, image loader 205 receives image data and also generates saliency maps from the image data as required.

Generator selector 210 operates as previously described in FIG. 2 and additionally, as shown in the embodiment of FIG. 18, comprises a coupling to template scaler 1825. Generator selector 210 provides collage generator selection information to template scaler 1825 for use in scaling templates.

Additive collage generator 215 operates as previously described in conjunction with FIG. 2 and FIG. 6 except that elements of additive collage generator 215 are now coupled to template scaler 1825 and configured to additively generate an occlusion costed collage within a templated viewing region provided by template scaler 1825. As shown in FIG. 6, additive collage generator is comprised of an image seeder 605, a trial layout provider 610, an occlusion cost generator 615, and an image adder 620. Image seeder 605 seeds a first image of a plurality of collaged images into a templated viewing region to start a templated collage. Trial layout provider 610 provides one or more trial layout arrangements where an additional image of the plurality of images being collaged is added to an existing additively generated collage. Occlusion cost generator 615 uses image saliency data to generate an occlusion cost for one or more trial layout arrangements. As described further below, the occlusion cost represents image saliency occluded and visible templated viewing region saliency occluded by a trial layout arrangement. Image adder 620 selects a position to add an image to the existing collage. Specific differences in the operation of the elements of additive collage generator 215, when used to generate templated collages, are discussed further below.

Iterative collage generator 220 operates as previously described in conjunction with FIG. 2 and FIG. 11 except that elements of iterative collage generator 220 are now coupled to template scaler 1825 and configured to iteratively generate an occlusion costed collage within a templated viewing region provided by template scaler 1825. As shown in FIG. 11, iterative collage generator 220 is comprised of initial layout generator 1105, layout adjuster 1110, occlusion cost generator 1115, and layout optimizer 1120. Initial layout generator 1105 generates an initial collage layout in a templated viewing region from a plurality of images being collaged. Layout adjuster 1110 incrementally adjusts collage layouts, such as the initial collage layout. Occlusion cost generator 1115 calculates occlusion costs for collage layouts, such as the incrementally adjusted layouts, from saliency data of the images in the collage layouts. Layout optimizer 1120 selects a layout from the incrementally adjusted layouts by comparing the occlusion costs of various layouts. Specific differences in the operation of elements of iterative collage generator 220, when used to generate templated collages, are further discussed below.

Template scaler 1825 is coupled to an input for receiving template data, such as digital data supplied by computer system 100, to create templated viewing regions. The received template data describes collage templates that are utilized by template scaler 1825 to create templated viewing regions for generating a collage within. Such collage templates comprise a variety of shapes, such as, for example: letters, words, numbers, rectangular shapes, irregular shapes, and etc., from which template scaler 1825 creates templated viewing regions.

Figure 19:
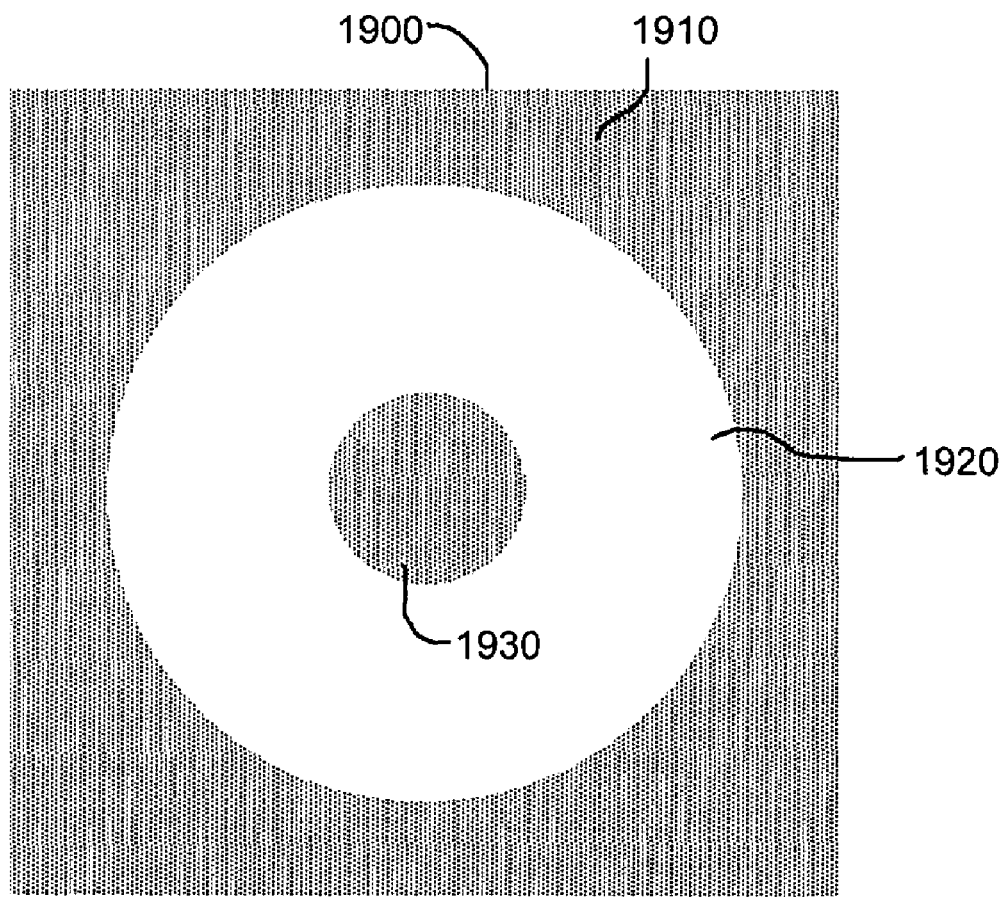
FIG. 19 shows an exemplary collage template, utilized by embodiments of the present invention.

FIG. 19 shows an exemplary collage template 1900, utilized by embodiments of the present invention. FIG. 19 is one example of a collage template that is received, in the form of template data, by template scaler 1825. Collage template 1900 is a template for collaging images to be printed on a compact disc label. Collage template 1900 is a binary template, or mask. In a templated viewing region created from a binary template, collages within the light colored visible portions, such as visible portion 1920, will be visible within a final collage. Images and portions of collages that reside in the dark colored non-visible portions of the binary template, such as masked non-visible portions 1910 and 1930, may not be visible in a final collage.

Figure 20:
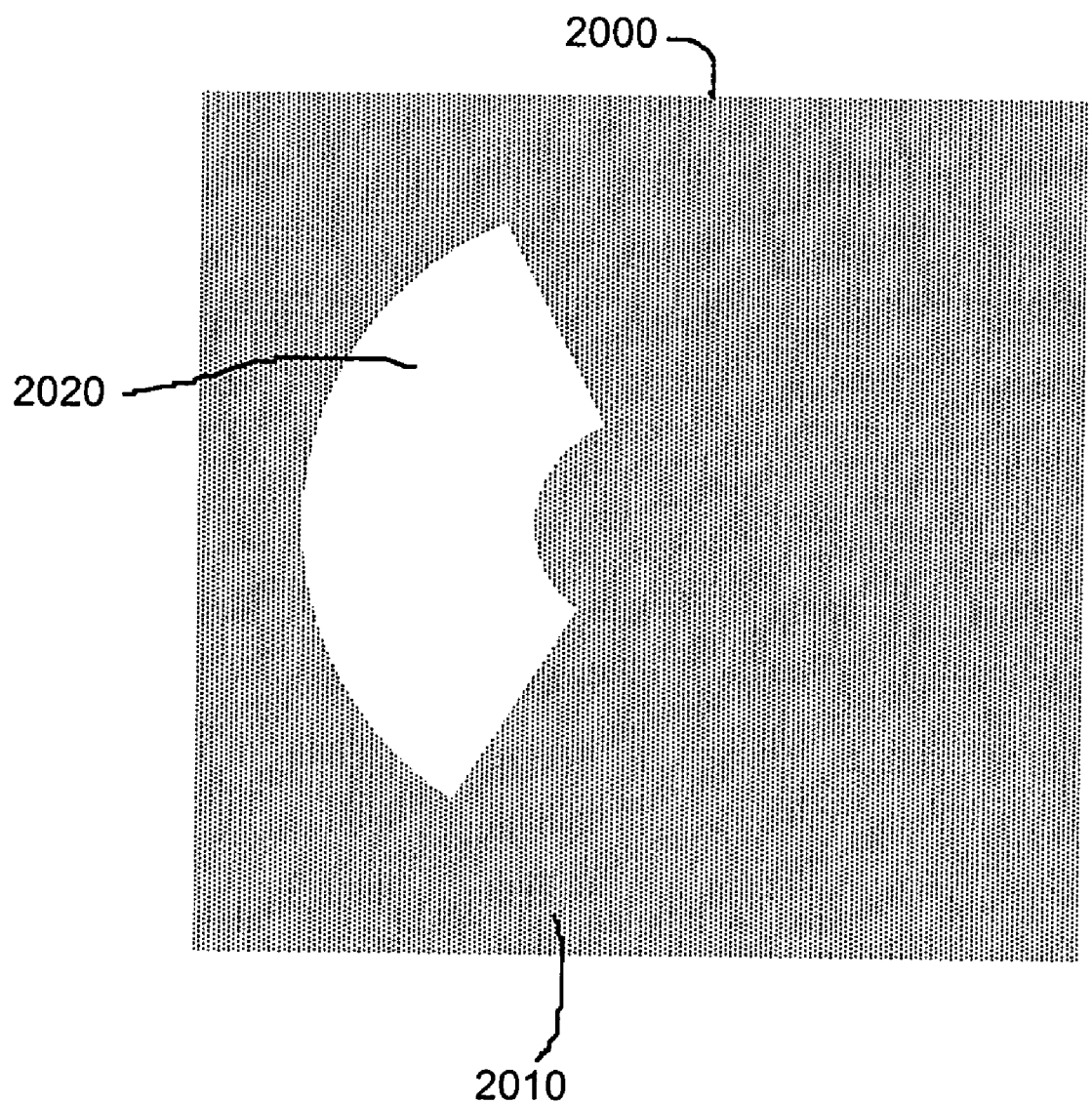
FIG. 20 shows another exemplary collage template utilized by embodiments of the present invention.

FIG. 20 shows another exemplary collage template 2000 utilized by embodiments of the present invention. Collage template 2000 is also a binary collage template, and is comprised of a visible portion 2020, and a masked non-visible portion 2010. Collage template 2000 is a collage template for a segment of a compact disc label.

Template scaler 1825 creates templated viewing regions by scaling a collage template, such as collage template 1900 or 2000, as needed relative to a plurality images being collaged. In one embodiment, template scaler 1825 scales the collage template relative to the number of images that are being collaged. For example, in one embodiment, template scaler 1825 scales the collage up from a default size to accommodate a large number of images, and down from a default size to accommodate a small number of images. Similarly, in another embodiment, template scaler 1825 scales the collage template relative to the total area of the images being collaged. For example, in one embodiment, template scaler 1825 scales the collage template such that a relatively constant pre-determined ratio is maintained between the total area of the images being collaged and the area of the visible portion of the resulting templated viewing region. This pre-determined ratio is equivalent to the collage efficiency, which has been previously described.

In one embodiment, where the total number and/or the total area of a plurality of images being collaged is known in advance of the creation of the collage, template scaler 1825 scales the collage template into a templated viewing region prior to the creation of the collage. In another embodiment where the total number and/or area of a plurality of images being collaged is not know in advance of the creation of the collage, template scaler 1825 automatically rescales the collage template into a templated viewing region in response to the addition of each new image to a collage. Template scaler 1825 couples templated viewing regions to additive collage generator 215 and/or iterative collage generator 220, as required, for use in generating templated collages.

Figure 21:
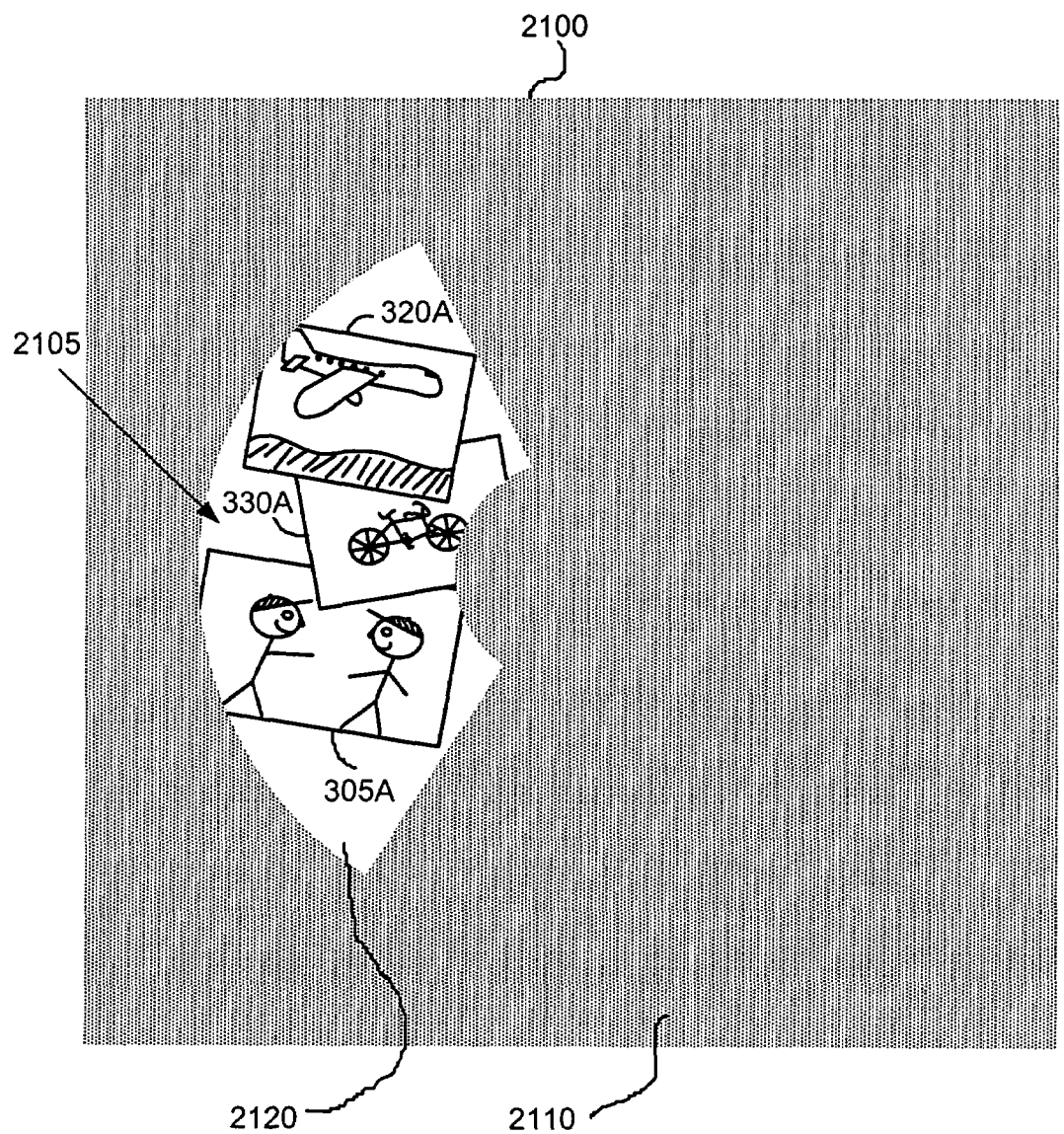
FIG. 21 shows an exemplary templated collage created within a templated viewing region in accordance with embodiments of the present invention.

FIG. 21 shows an exemplary templated collage 2105 within a templated viewing region 2100 in accordance with embodiments of the present invention. Templated collage generation system 1800 has generated templated collage 2105 via an occlusion costed templated collage generation technique which attempts to maximize the presentation of the visible saliency of images within the visible portion 2120 of templated viewing region 2100.

In FIG. 21, templated viewing region 2100 is an example of a templated viewing region created by template scaler 1825. In one embodiment, for example, template scaler 1825 generates templated viewing region 2100 by scaling collage template 2000 (FIG. 20) upwards in size to accommodate the collaging of a plurality of images. Thus, non-visible portion 2110 is larger than non-visible portion 2010 (FIG. 20), and likewise, visible portion 2120 is larger than visible portion 2020 (FIG. 20). Template scaler 1825 has scaled templated viewing region 2100 to an appropriate size (as previously described) relative to images, such as, for example, image 305A, 320A, and 330A (which are part of the previously described image tiles such as image tile 510A shown in FIG. 5), to facilitate collaging these images within visible portion 2120 of templated viewing region 2100. It is appreciated that in other embodiments, template scaler 1825 performs template scaling in the same manner relative to image data for images of any size or orientation, whether associated with image tiles or not.

Figure 22:
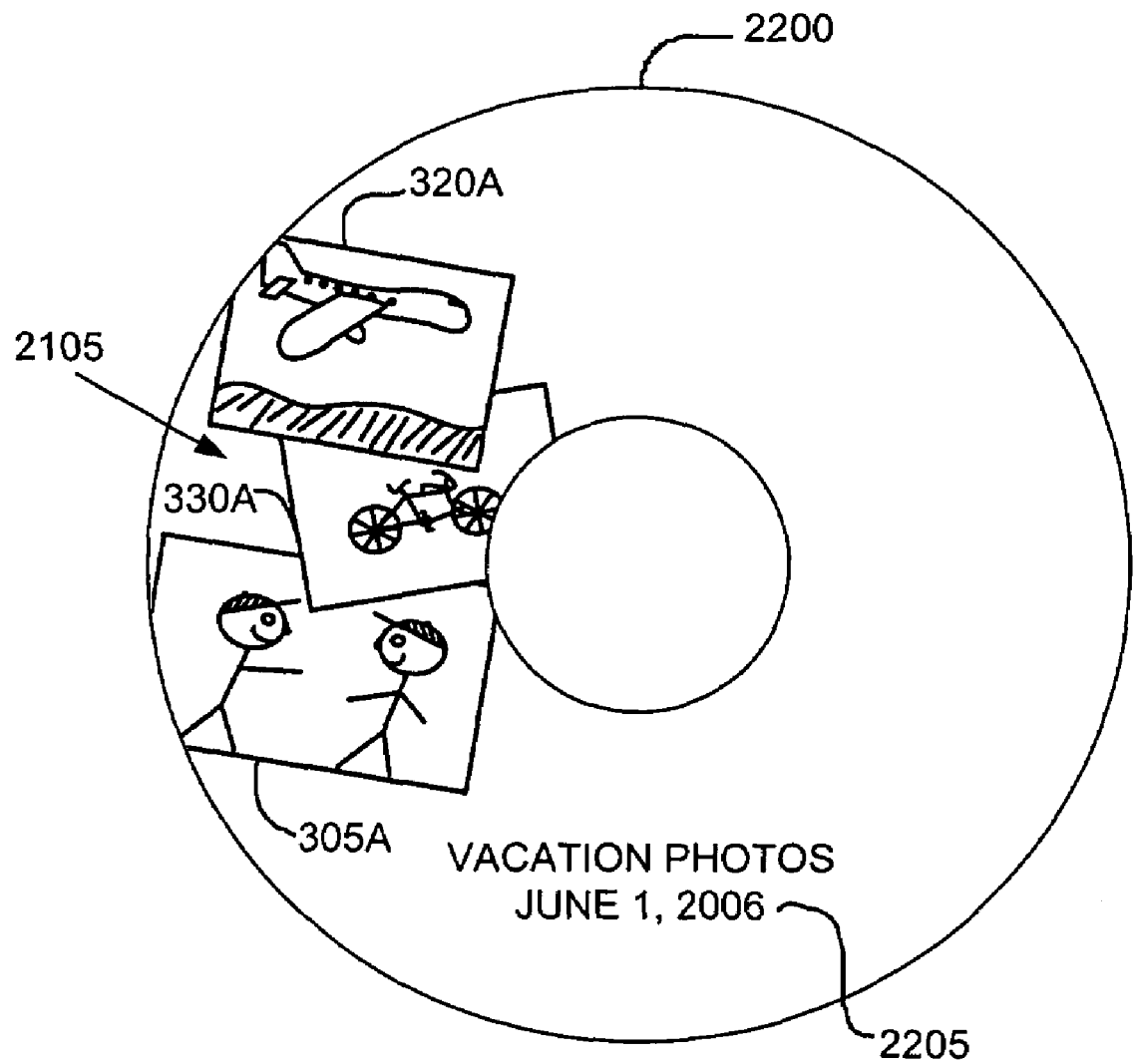
FIG. 22 shows a compact disc label with an exemplary collage created in accordance with embodiments of the present invention.

FIG. 22 shows a compact disc label 2200 with an exemplary templated collage 2105 created in accordance with embodiments of the present invention. Compact disc label 2200 is comprised of templated collage 2105, which shows images 305A, 320A, and 330A collaged together in an occlusion costed manner that attempts to maximize the presentation of the saliency of these images, while still confining templated collage 2105 to a small portion of compact disc label 2200. In this example, templated collage 2105 provides a collaged sampling of the images stored on a labeled compact disc. Also, in this example, templated collage 2105 takes up only a small portion of compact disc label 2200 thus allowing for other portions of compact disc label 2200 to be used for words 2205, other templated collages, or other information about the contents stored on a labeled compact disc. Compact disc label 2200 is but a single example of how a templated collage can be utilized. It is appreciated that in other examples, several hundreds or thousands of images may be collaged to form collages in the shapes of letters, words, numerals, shapes, images, and such, as dictated by a particular templated viewing region. In exemplary compact disk label 2200, portions of images 305A, 330A, and 320A that are located in non-visible portion 2110 of templated viewing region 2100 have been truncated. However, it is appreciated that in other embodiments these portions of the images are present in a final templated collage product rather than being truncated.

Templated Iterative Collage Generation with Occlusion Costing

FIG. 23 is a flow diagram 2300 of a method of iteratively generating a templated collage of images, according to one embodiment of the present invention. At 2310 of flow diagram 2300, in one embodiment, image saliency data is received for a plurality of images which are to be collaged within a templated viewing region. This is analogous to block 1210 of FIG. 12, except that the images received are to be collaged within a templated viewing region provided by template scaler 1825, such as, for example, templated viewing region 2100. At 2310 of method 2300, as in 1210 of method 1200, iterative collage generator 220 (FIG. 2 and FIG. 11) employs initial layout generator 1105 (FIG. 11) to receive this image saliency data. In some embodiments of the present invention, initial layout generator 1105 receives a variety of image information comprised of image data such as: image bitmaps, image saliency data, and image tiles (such as image tiles 510 and 510A (FIG. 5)).

At 2315 of FIG. 23, a template is scaled relative to a plurality of images to generate a templated viewing region. The plurality of images are those which are being collaged together within the templated viewing region. Template scaler 1825 performs this scaling, as previously described in conjunction with FIG. 18, by scaling a received collage template, such as binary template 2000. In some embodiments, as described below, template scaler 1825 performs template scaling in conjunction with layout generator 1105 (FIG. 11). In various embodiments, the collage template is scaled relative to a total number of a plurality of images being collaged or relative to a total image area of a plurality of images being collaged. The scaled collage template becomes a templated viewing region and is coupled from template scaler 1825 to a collage generator such as additive collage generator 215 (FIG. 2 and FIG. 6) and/or iterative collage generator 220. In one embodiment, for example, template scaler 1825 generates a templated viewing region from a collage template by scaling the collage template relative to the plurality of images being collaged such that a relatively constant pre-determined ratio is maintained between the total area of the images being collaged and the area of the visible portion of the resulting templated viewing region.

At 2320 of flow diagram 2300, in one embodiment, an initial collage layout is generated within a templated viewing region from the plurality of received images. These actions are analogous to the previously described actions which take place in block 1220 of flow diagram 1200, except for minor modifications to facilitate generating the initial layout within a templated viewing region provided by template scaler 1825. In block 2320 of flow diagram 2300, as in block 1220 of flow diagram 1200, in one embodiment, initial layout generator 1105 generates this initial collage layout from a plurality of received image tiles, such as image tiles 510 or 510A, by placing the image tiles within a defined viewing region. Templated viewing region 2100 (FIG. 21) is an example of such a defined viewing region. Initial layout generator 1105 operates in conjunction with template scaler 1825 to fix the area of the visible portion of a templated viewing region relative to the total image area of a plurality of images being collaged. This establishes a predetermined collage efficiency (previously described) for the collage. For example, in one embodiment, initial layout generator 1105 establishes a ratio such that template scaler 1825 generates a templated viewing region, such as, for example, a binary templated viewing region, with a visible portion that is 20% smaller than the total image area of a plurality of images being collaged.

Initial layout generator 1105 generates initial collage layouts by placing each image being collaged into the templated viewing region. This placement can be randomized, or according to a grid, pattern, or some other structured means. The images may be placed at any location within a templated viewing region; however, gains in collage generation speed will typically be experienced if the images are placed at starting points that are close to their eventual locations in a final collage. Thus, in one embodiment, images in an initial collage layout for a templated collage are placed such that they are at least partially within the visible portion of the templated viewing region. In such an embodiment, initial layout generator 1105 ensures that each image lies at least partially within a visible portion of the templated viewing region. If an image does not lie at least partially within the visible portion of the templated viewing region, a new location is chosen until the image does lie at least partially within the templated viewing region.

Likewise, in one embodiment, initial collage generator 1105 operates in the same manner to ensure that a center portion of each image, of a plurality of images being collaged, is located within a visible portion of a templated viewing region. If a center point of an image does not lie within the visible portion of the templated viewing region, a new location is chosen until the center point of the image does lie within the templated viewing region. Depending upon the templated viewing region, such techniques for optimizing initial layouts of images may reduce the number of iterations, time, and computing power required to generate a final collage.

At 2330 of flow diagram 2300, in one embodiment, the initial collage layout is optimized. Optimizing comprises iteratively adjusting the collage layout by selecting a minimized layout occlusion cost. The iterative optimization process involves providing a plurality of z-order adjusted locations and/or two-dimensional adjusted positions to individual collage images. Iterative optimization is performed in the same manner previously described in conjunction with block 1230 of FIG. 12, except that when a collage layout is scored for occlusion cost, each pixel of the visible saliency in the collage is multiplied by the binary portion of the templated viewing region it which it appears. Thus, for example, if a pixel appears in non-visible portion 2110 of binary templated viewing region 2100, the pixel is considered occluded. Following this example, iterative optimizations will lead to the plurality of images becoming collaged substantially within the visible portion 2120 of a binary templated viewing region 2100. In one embodiment, optimizing of the initial collage layout continues until a predetermined occlusion cost is achieved. In another embodiment, optimizing of the initial collage layout continues until a predetermined number of z-ordering and/or two-dimensional adjustment iterations have been achieved.

In 2330 of flow diagram 2300, layout adjuster 1110, occlusion cost generator 1115, and layout optimizer 1120 (all of FIG. 11) work together to carry out the iterative optimization. Layout adjuster 1110 performs z-ordered adjustments and/or two-dimensional nudging adjustments to a collage layout. Occlusion cost generator 1115 calculates occlusion costs for adjusted layouts. Finally, layout optimizer 1120 compares the occlusion costs of a plurality of adjusted layouts to select a layout with a lowest occlusion cost. Except for the addition of the multiplication of pixel values with the binary portions of the templated viewing region, this is performed in the same manner as previously described in conjunction with block 1230 of flow diagram 1200. Thus, in one embodiment, the optimizing comprises selecting a lowest z-ordering layout occlusion cost from a plurality of z-ordered layouts, and selecting a lowest two-dimensionally adjusted layout occlusion cost from a plurality of two-dimensionally adjusted layouts.

As previously described in conjunction with flow diagram 1200, in one embodiment, selecting a lowest z-ordering layout occlusion cost from a plurality of z-ordered layouts comprises calculating layout occlusion costs for z-ordering a particular image above and below all other images of the plurality of images being collaged within a templated viewing region. The collage is then updated to reflect a lowest layout occlusion cost based on this calculating. In one embodiment, the calculating and updating are then repeated for similar z-ordered locations (both above and below all other images being collaged) of each of the images in the plurality of images that are being collaged within the templated viewing region. It is appreciated that in other embodiments, more or less z-ordered locations for each image may be checked.

Also, as previously described in conjunction with flow diagram 1200, in one embodiment selecting a lowest two-dimensionally adjusted layout occlusion cost from a plurality of two-dimensionally adjusted layouts comprises calculating layout occlusion costs for a plurality of slightly two-dimensionally adjusted (nudged) positions of an image in the collage. The collage is then updated to reflect a lowest layout occlusion cost based on this calculating. In one embodiment, the calculating and updating are then repeated for slightly two-dimensionally adjusted (nudged) locations for each of the images in the plurality of images being collaged within the templated viewing region.

Templated Additive Collage Generation with Occlusion Costing

FIG. 24 is a flow diagram 2400 of a method of additively generating a templated collage of images, according to one embodiment of the present invention. At 2410 of flow diagram 2400, in one embodiment, image seeder 605 (FIG. 6) of additive collage generator 215 (FIG. 2 and FIG. 6) seeds a first image into a templated viewing region provided by template scaler 1825 (FIG. 18). The seeded image can be any type of digital image, and in one embodiment comprises an image such as image tile 510 or 510A (both of FIG. 5). As previously described, image seeder 605 can seed an image into any portion of a templated viewing region; however, additive collage generation is typically more effective if the initial image is seeded so that it is at least partially within the visible portion of a templated viewing region. Since the additive collage generation process is not typically performed iteratively, an improved final collage will generally be achieved by an embodiment where the initial collage image is seeded so that saliency of the seeded image is maximally within the visible portion of the templated viewing region. Image 305A of FIG. 21 is exemplary of a seeded image located such that a large amount of its saliency resides within visible portion 2120 of templated viewing region 2100. In this example, only a small amount of saliency, a portion of a leg of the person on the left side of the image, is located within the non-visible portion 2110 of templated viewing region 2100.

At 2415 of flow diagram 2400 template scaler 1825 scales the templated viewing region relative to a plurality of images being collaged within the templated viewing region. As previously described, in an embodiment where data about the plurality of images being collaged is known in advance (such as the number or total image area of the plurality of images being collaged), image scaler 1825 performs the scaling prior to the additive generation of the collage, and even prior to the seeding of the initial image. In one embodiment where data about the plurality of images is not known in advance, template scaler 1825 rescales the size of the templated viewing region relative to the plurality of images being collaged as each new image is received to be added to a trial layout arrangement by trial layout provider 610. In one embodiment, for example, template scaler 1825 generates a templated viewing region from a collage template by scaling the collage template relative to the plurality of images being collaged such that a relatively constant pre-determined ratio is maintained between the total area of the images being collaged and the area of the visible portion of the resulting templated viewing region.

At 2420 of flow diagram 2400, trial layout provider 610 provides a plurality of trial layout arrangements with an additional image added to the collage. The plurality of trial layout arrangements is provided as previously described in block 720 of flow diagram 700. For example, in one embodiment, trial layout provider 610 generates a plurality of trial layout arrangements that is comprised of a plurality of two-dimensional locations of the additional image within the templated viewing region, where the additional image z-ordered above the other images of collage in each of these arrangements. In one embodiment, trial layout provider 610 generates a plurality of trial layout arrangements that is comprised of a plurality of two-dimensional locations of the additional image within the templated viewing region, where the additional image z-ordered above the other images of collage in each of these arrangements. In one embodiment, trial layout provider 610 generates both of the previously described pluralities of trial layout arrangements. In other embodiments, trial layout arranger 610 generates a plurality of trial layout arrangements, where the additional image is z-ordered at a plurality of positions and is also located at a plurality of two-dimensional locations relative to the other images in the collage. In one embodiment, due to the nature of the templated viewing regions utilized, the additive collage generation process can be shortened by restricting trial layout generator 610 to only generating or providing trial layout arrangements where the added image lies at least partially within a visible portion of the templated viewing region in which the collage is being generated.

At 2430 of flow diagram 2400, occlusion cost generator 615 generates an occlusion cost for a trial layout arrangement of the plurality of trial layout arrangements. The occlusion cost represents image saliency occluded and visible templated viewing region saliency occluded by the trial layout arrangement. This occlusion cost generation is carried out by calculating visible saliency or occluded saliency in a collage, for example, through use of image saliency maps for the images being collaged. Occlusion costing is performed in substantially the same manner previously described in conjunction with block 730 of flow diagram 700, except that in one embodiment, either no salience or a low uniform salience is attributed to the visible portion of the templated viewing region, while a high uniform salience attributed to the non-visible portion of the templated viewing region. It is also appreciated that in some embodiments, non-uniform salience values can be attributed to either the visible portion of a templated viewing region, the non-visible portion of a templated viewing region, or both. In one embodiment, if more than one trial layout arrangement is provided, occlusion cost generator 615 calculates an occlusion cost for each trial layout arrangement that is provided. In another embodiment, occlusion cost generator 615 only calculates an occlusion cost for a subset of the trial layouts that are provided, such as, for example, the trial layouts in which the additional image that is added to the collage lies at least partially within a visible portion of the templated viewing region.

Attributing high salience to non-visible portions of a templated viewing region ensures that trial layout arrangements with salient portions of images which lie in these non-visible portions of the templated viewing region will typically receive a high occlusion cost from occlusion cost generator 615. Likewise, attributing low salience to the visible portion of a templated viewing region ensures that trial layout arrangements with images that are overly spread out within the visible portion of the templated viewing region will typically receive higher occlusion costs from occlusion cost generator 615 than trial layout arrangements with images that are more tightly overlapped within the visible portion of the templated viewing region. Similarly, increasing the salience for the non-visible portion of templated viewing region relative to the visible portion of the templated viewing region will typically result in trial layout arrangements receiving lower occlusion costs from occlusion cost generator 615 when more image saliency appears within the visible portion of the templated viewing region than within the non-visible portion of the templated viewing region.

At 2440 of flow diagram 2400, image adder 620 (FIG. 6) adds an image to the collage. Image adder 620 adds the image in a z-ordered position and two-dimensional location such that the collage is updated to reflect one of the trial layout arrangements for which an occlusion cost has been generated. In one embodiment, image adder 620 adds the image such that the collage is updated to reflect a lowest occlusion cost layout arrangement of a plurality of trial layout arrangements for which occlusion cost generator 615 has generated an occlusion cost. The process of adding an image is consistent with the image adding process described in conjunction with block 740 of flow diagram 700, except that the image is being added to a templated collage.

At 2450 of flow diagram 2400, additive collage generator 215 incorporates a plurality of images sequentially into the collage that is being generated within the templated viewing region. This incorporating is performed consistent with the manner described in conjunction with block 750 of flow diagram 700. In one embodiment, this comprises sequentially repeating the providing of trial layout arrangements with a new image added, the generation of an occlusion cost for one or more of the trial layout arrangements, and the adding of a new image to the collage. In such an embodiment, a collage of a plurality of images is additively created by repeating blocks 2420, 2430, and 2440, to sequentially add a plurality of images to a collage being created in a templated viewing region. Additionally, if required, block 2415 is repeated to rescale a templated viewing region when a new image is added to the collage.

Although the subject matter of the present invention has been described in a language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computer implemented method of iteratively generating a collage of images, said method comprising:
    receiving image saliency data for a plurality of images, said plurality of images to be collaged within a templated viewing region;
    scaling a template relative to said plurality of images to generate said templated viewing region;
    generating an initial collage layout of said plurality of images within said templated viewing region; and
    optimizing said initial collage layout, wherein said optimizing comprises iteratively adjusting said initial collage layout by selecting a minimized layout occlusion cost.

2. The computer implemented method as recited in claim 1, wherein said generating an initial collage layout of said plurality of images within said templated viewing region comprises:
    generating said initial collage layout of said plurality of images within said templated viewing region, wherein each of said plurality of images lies at least partially within a visible portion of said templated viewing region.

3. The computer implemented method as recited in claim 1, wherein said generating an initial collage layout of said plurality of images within said templated viewing region further comprises:
ensuring a center portion of each image of said plurality of images is located within a visible portion of said templated viewing region.

4. The computer implemented method as recited in claim 1, wherein said optimizing said initial collage layout, wherein said optimizing comprises iteratively adjusting said initial collage layout by selecting a minimized layout occlusion cost further comprises:
continuing said optimizing of said initial collage layout until a predetermined occlusion cost is achieved.

5. The computer implemented method as recited in claim 1, wherein said optimizing said initial collage layout, wherein said optimizing comprises iteratively adjusting said initial collage layout by selecting a minimized layout occlusion cost further comprises:
continuing said optimizing of said initial collage layout until a predetermined number of adjustment iterations is achieved.

6. The computer implemented method as recited in claim 1, wherein said optimizing said initial collage layout, wherein said optimizing comprises iteratively adjusting said initial collage layout by selecting a minimized layout occlusion cost further comprises:
selecting a lowest z-ordering layout occlusion cost from a plurality of z-ordered layouts; and
selecting a lowest two-dimensionally adjusted layout occlusion cost from a plurality of two-dimensionally adjusted layouts.

7. The computer implemented method of claim 6, wherein said selecting a lowest z-ordering layout occlusion cost from a plurality of z-ordered layouts comprises:
calculating layout occlusion costs for z-ordering an image above and below all other images of said plurality of images;
updating said collage to reflect a lowest layout occlusion cost based on said calculating; and
repeating said calculating and said updating for each of said images in said plurality of images.

8. The computer implemented method as recited in claim 6, wherein said selecting a lowest two-dimensionally adjusted layout occlusion cost from a plurality of two-dimensionally adjusted layouts comprises:
calculating layout occlusion costs for a plurality of slightly two-dimensionally adjusted positions of an image in said collage;
updating said collage to reflect a lowest layout occlusion cost based on said calculating; and
repeating said calculating and said updating for each of said images in said plurality of images.

9. A computer implemented method of additively generating a collage of images, said method comprising:
seeding a first image into a templated viewing region to start said collage;
providing a plurality of trial layout arrangements with an additional image added to said collage;
generating an occlusion cost for a trial layout arrangement of said plurality of trial layout arrangements, wherein said occlusion cost represents image saliency occluded and visible templated viewing region saliency occluded by said trial layout arrangement; and
adding an image to said collage, wherein said collage is updated to reflect one of said trial layout arrangements for which said occlusion cost has been generated.

10. The computer implemented method as recited in claim 9, further comprising:
scaling said templated viewing region relative to a plurality of images being collaged.

11. The computer implemented method as recited in claim 9, further comprising:
incorporating a plurality of images sequentially into said collage, wherein said incorporating comprises repeating said providing, said generating, and said adding until said plurality of images is incorporated into said collage.

12. The computer implemented method as recited in claim 9, wherein said seeding a first image into a templated viewing region to start said collage comprises:
seeding said first image into said templated viewing region to start said collage, wherein said first image is seeded at least partially within a visible portion of said templated viewing region.

13. The computer implemented method as recited in claim 9, wherein said providing a plurality of trial layout arrangements with an additional image added to said collage comprises:
providing said plurality of trial layout arrangements with said additional image added to said collage, wherein said additional image lies at least partially within a visible portion of said templated viewing region.

14. The computer implemented method as recited in claim 9, wherein said providing a plurality of trial layout arrangements with an additional image added to said collage comprises:
generating a first plurality of trial layouts comprised of a plurality of two-dimensional locations of said additional image within said templated viewing region, wherein said additional image is z-ordered above said collage; and
generating a second plurality of trial layouts comprised of a plurality of two-dimensional locations of said additional image within said templated viewing region, wherein said additional image is z-ordered below said collage.

15. The computer implemented method as recited in claim 9, wherein said generating an occlusion cost for a trial layout arrangement of said plurality of trial layout arrangements, wherein said occlusion cost represents image saliency occluded and visible templated viewing region saliency occluded by said trial layout arrangement further comprises:
attributing a low uniform salience to a visible portion of said templated viewing region; and
attributing a high uniform salience to a non-visible portion of said templated viewing region.

16. The computer implemented method as recited in claim 9, wherein said adding an image to said collage, wherein said collage is updated to reflect one of said trial layout arrangements for which said occlusion cost has been generated comprises:
adding said image to said collage, wherein said collage is updated to reflect a lowest occlusion cost layout arrangement of said trial layout arrangements for which said occlusion cost has been generated.

17. A system for automatically generating a collage of images, said system comprising:
an image saliency data receiving module configured to receive image saliency data;
a collage generator utilizing an occlusion costing technique to generate said collage wherein said occlusion costing technique utilizes said image saliency data; and
a template scaler configured to couple to said collage generator, said template scaler for generating a templated viewing region by scaling a template relative to a plurality of images being collaged.

18. The system as recited in claim 17, further comprising:

an image loader configured to couple to said collage generator and to a computer system, said image loader for receiving image data and generating saliency maps from said image data.

19. The system as recited in claim 17, wherein said collage generator comprises:

an image seeder for seeding a first image of said plurality of images into said templated viewing region to start said collage;

a trial layout provider for providing a trial layout arrangement with an additional image of said plurality of images added to said collage; and an occlusion cost generator for generating an occlusion cost for said trial layout arrangement, wherein said occlusion cost represents image saliency occluded and visible templated viewing region saliency occluded by said trial layout arrangement.

20. The system as recited in claim 17, wherein said collage generator comprises:

an initial layout generator for generating an initial collage layout, said initial collage layout generated in said templated viewing region from said plurality of images;

a layout adjuster for incrementally adjusting collage layouts; and an occlusion cost generator for calculating occlusion costs for an incrementally adjusted collage layout.

\* \* \* \* \*